United States Patent
Matsuike et al.

(10) Patent No.: US 9,319,334 B2
(45) Date of Patent: Apr. 19, 2016

(54) APPARATUS AND METHOD FOR CONTROLLING CONGESTION IN A COMMUNICATION NETWORK

(71) Applicant: FUJITSU LIMITED, Kawasaki-shi, Kanagawa (JP)

(72) Inventors: Mitsumasa Matsuike, Kawasaki (JP); Nobuhiro Rikitake, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 182 days.

(21) Appl. No.: 13/850,392

(22) Filed: Mar. 26, 2013

(65) Prior Publication Data
US 2013/0315065 A1 Nov. 28, 2013

(30) Foreign Application Priority Data
May 28, 2012 (JP) .................................. 2012-120863

(51) Int. Cl.
*H04L 12/801* (2013.01)
*H04L 12/825* (2013.01)
*H04L 12/50* (2006.01)

(52) U.S. Cl.
CPC .............. *H04L 47/33* (2013.01); *H04L 47/11* (2013.01); *H04L 47/26* (2013.01)

(58) Field of Classification Search
CPC ..... H04L 47/10; H04L 47/2441; H04L 47/15; H04L 41/0893; H04L 47/11; H04L 49/3045
USPC .......... 370/229, 230, 235, 292, 363, 389, 395
See application file for complete search history.

(56) References Cited

U.S. PATENT DOCUMENTS

| 6,667,985 | B1 | 12/2003 | Drummond-Murray |
| 7,733,770 | B2 * | 6/2010 | McAlpine et al. ............ 370/229 |
| 8,625,597 | B2 * | 1/2014 | Berman ........................ 370/392 |
| 8,687,649 | B2 * | 4/2014 | Armstrong ............. H04L 69/08 370/360 |
| 2004/0081090 | A1 | 4/2004 | Hara et al. |
| 2005/0163132 | A1 | 7/2005 | Mieno et al. |
| 2006/0092836 | A1 * | 5/2006 | Kwan ..................... H04L 47/10 370/229 |
| 2007/0237177 | A1 | 10/2007 | Endo et al. |

(Continued)

FOREIGN PATENT DOCUMENTS

| JP | 2003-92593 | 3/2003 |
| JP | 2004-104427 | 4/2004 |

(Continued)

OTHER PUBLICATIONS

IEEE Std 802.1 Qau™—2010, "Virtual Bridged Local Area Networks Amendment 13: Congestion Notification", Approved Mar. 25, 2010, pp. i-119.

(Continued)

*Primary Examiner* — Charles C Jiang
*Assistant Examiner* — Will Lin
(74) *Attorney, Agent, or Firm* — Staas & Halsey LLP

(57) ABSTRACT

An apparatus controls congestion in a communication network. The apparatus includes a plurality of ports configured to transmit and receive frames. The apparatus stores a traffic volume of each of the plurality of ports. The apparatus detects congestion in the communication network, based on frames that are received via the plurality of ports. Then, the apparatus determines one or more ports that receive frames causing the detected congestion, based on the traffic volumes of the plurality of ports.

19 Claims, 18 Drawing Sheets

(56) References Cited

U.S. PATENT DOCUMENTS

| | | |
|---|---|---|
| 2008/0253289 A1 | 10/2008 | Naven et al. |
| 2011/0292893 A1* | 12/2011 | Lee ............... H04W 74/002 370/329 |
| 2011/0299391 A1* | 12/2011 | Vobbilisetty et al. ...... 370/230.1 |
| 2012/0039171 A1* | 2/2012 | Yamada ............... H04L 47/12 370/232 |
| 2012/0051297 A1* | 3/2012 | Lee ............... H04W 74/006 370/329 |
| 2012/0063316 A1* | 3/2012 | Ghanwani et al. ............ 370/235 |
| 2012/0307631 A1* | 12/2012 | Yang et al. ................... 370/230 |
| 2013/0051228 A1* | 2/2013 | Kim ................. H04W 4/005 370/230 |
| 2013/0100895 A1* | 4/2013 | Aghili ................ H04W 4/00 370/329 |
| 2013/0322387 A1* | 12/2013 | Kim ................. H04W 74/002 370/329 |

FOREIGN PATENT DOCUMENTS

| | | |
|---|---|---|
| JP | 2004/040854 | 3/2006 |
| JP | 2007-174152 | 7/2007 |
| JP | 2007-526706 | 9/2007 |
| JP | 2007-282037 | 10/2007 |
| JP | 2011-119850 | 6/2011 |

OTHER PUBLICATIONS

Japanese Office Action dated Nov. 17, 2015 in corresponding Japanese Patent Application No. 2012-120863, 5 pages.

* cited by examiner

FIG. 14

| Port | VLAN | MAC ADDRESS | STATISTICAL INFORMATION (Byte/sec) |
|---|---|---|---|
| Port1 | 1 | A, B | 30 M |
| Port1 | 2 | C | 35 M |
| Port2 | 1 | D | 50 M |
| Port2 | 3 | E, F | 5 M |

APPARATUS AND METHOD FOR CONTROLLING CONGESTION IN A COMMUNICATION NETWORK

CROSS-REFERENCE TO RELATED APPLICATION

This application is based upon and claims the benefit of priority of the prior Japanese Patent Application No. 2012-120863, filed on May 28, 2012, the entire contents of which are incorporated herein by reference.

FIELD

The embodiments discussed herein are related to apparatus and method for controlling congestion in a communication network

BACKGROUND

With the spread of Internet and wide area Ethernet services, data centers are widely utilized. There are data centers that have various computers, communication devices, and the like located therein for operation.

As one of the standards related to 10 gigabit Ethernet, there is IEEE 802.1 Qau Congestion Notification (CN) standard. In this standard, an L2 switch where congestion occurs sends a congestion notification message (CNM) to a server that is considered to cause the congestion, so as to inhibit a traffic volume to be transmitted by the server that has received the CNM. Other than this, various methods of resolving congestion are also proposed (for example, refer to Japanese Laid-open Patent Publications Nos. 2004-104427, 2007-282037, and 2003-092593).

SUMMARY

According to an aspect of the invention, there is provided an apparatus for controlling congestion in a communication network. The apparatus includes a plurality of ports configured to transmit and receive frames. The apparatus stores a traffic volume of each of the plurality of ports. The apparatus detects congestion in the communication network based on frames that are received via a plurality of ports, and determines one or more ports that receive frames causing the detected congestion, based on the traffic volumes of the plurality of ports.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 14 is a diagram illustrating an example of a media access control (MAC) table that stores statistical information for each virtual local area network (VLAN), according to an embodiment;

DESCRIPTION OF EMBODIMENTS

Hereinafter, descriptions will be given of embodiments of the present technique with reference to the drawings.

Figure 1:
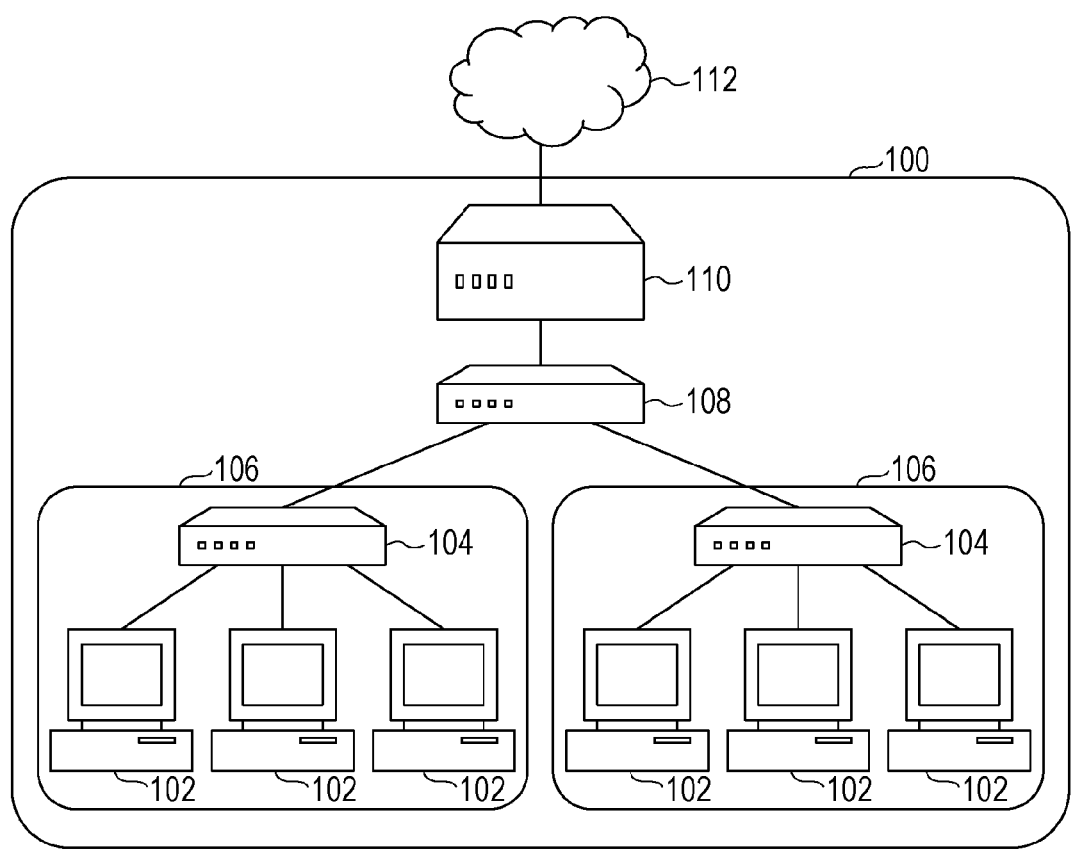
FIG. 1 is a diagram illustrating a configuration example of a data center.

FIG. 1 is a diagram illustrating a configuration example of a data center.

As illustrated in FIG. 1, a data center 100 has a plurality of racks 106 located therein, and each rack 106 equipped with a plurality of servers 102 and a top of rack (ToR) switch 104 connected to the plurality of servers 102. The top of rack (ToR) switch 104 is, in many cases, an L2 switch. Each server 102 is connected to an external network 112 via the ToR switch 104 of each rack 106, an aggregation switch 108, and a router 110 that is provided with a security function.

Here, descriptions will be given of a CNM that is used in order to avoid frame loss in the above mentioned data center.

Figure 2:
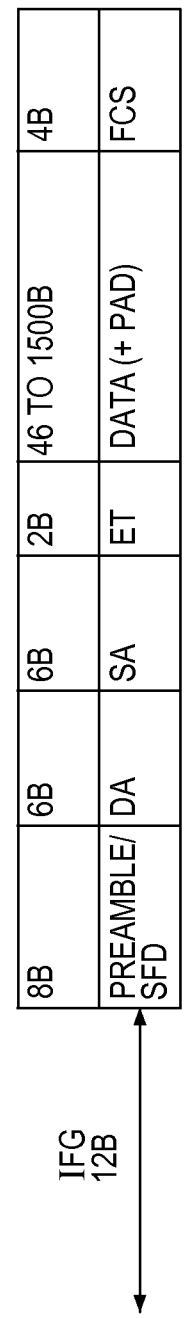
FIG. 2 is a diagram illustrating an example of a format of Ethernet frame.

Firstly, FIG. 2 illustrates an example of an Ethernet frame format. In FIG. 2, an Ether Type (ET) field of two bytes (B) represents a frame type of an Ethernet frame. For example, 0x22E7 indicates a CNM frame, 0x8100 indicates a VLAN tagged frame in conformity with the IEEE 802.1 Q standard, 0x8906 indicates a fiber channel over Ethernet (FCoE) frame, and 0x8914 indicates a FCoE initialization protocol (FIP) frame.

Figure 3:
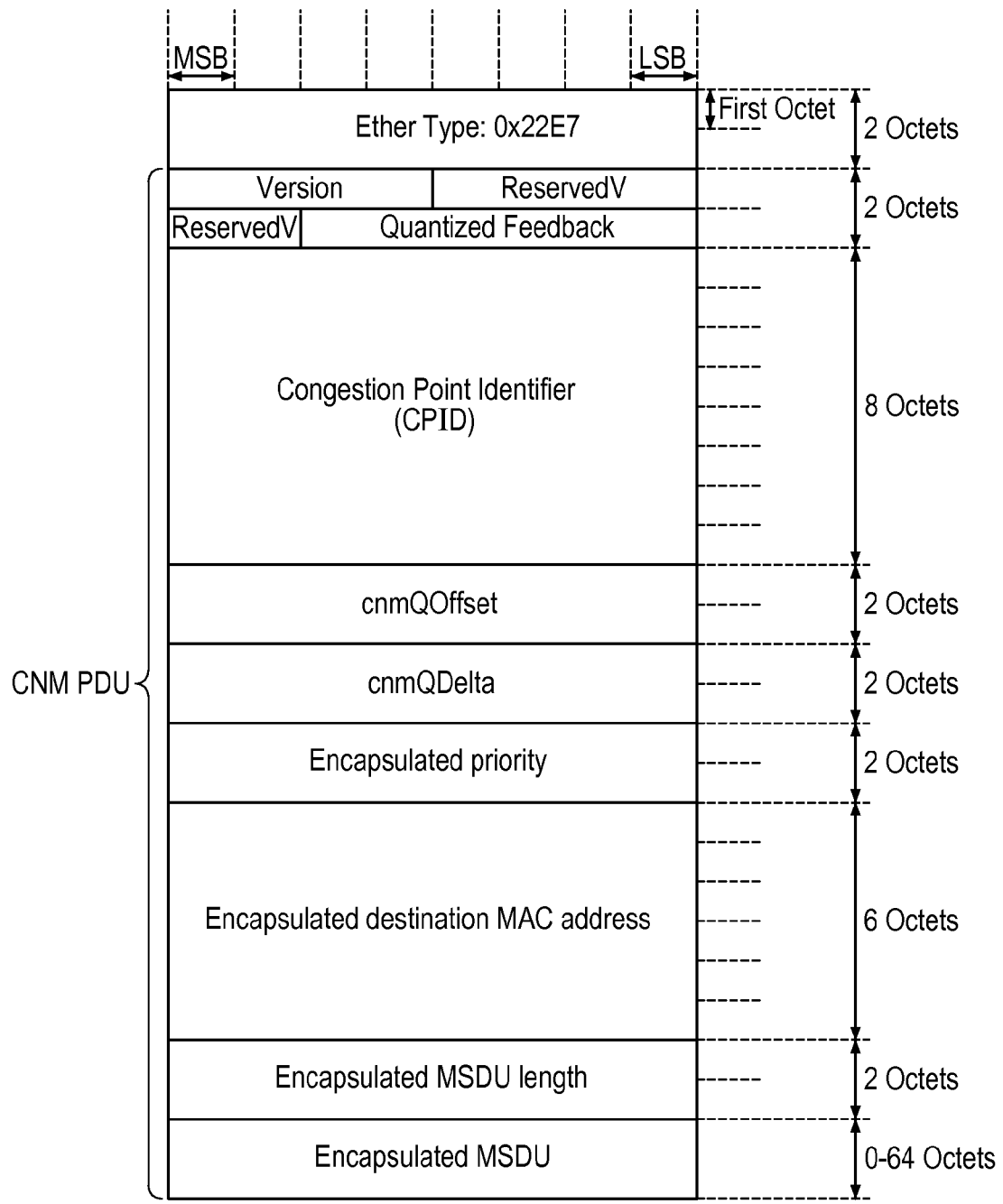
FIG. 3 is a diagram illustrating an example of a format of a congestion notification message (CNM)

FIG. 3 represents a case that 0x22E7 is set for the ET field in FIG. 2, that is, a frame format of a CNM. For simplicity, FIG. 3 represents a Type field and later within the Ethernet frame format depicted in FIG. 2. The server 102 that has received such a CNM inhibits a transmission rate based on a value that is stored in a Quantized Feedback field included in the CNM. The inhibition rate is at most 50%.

Figure 4:
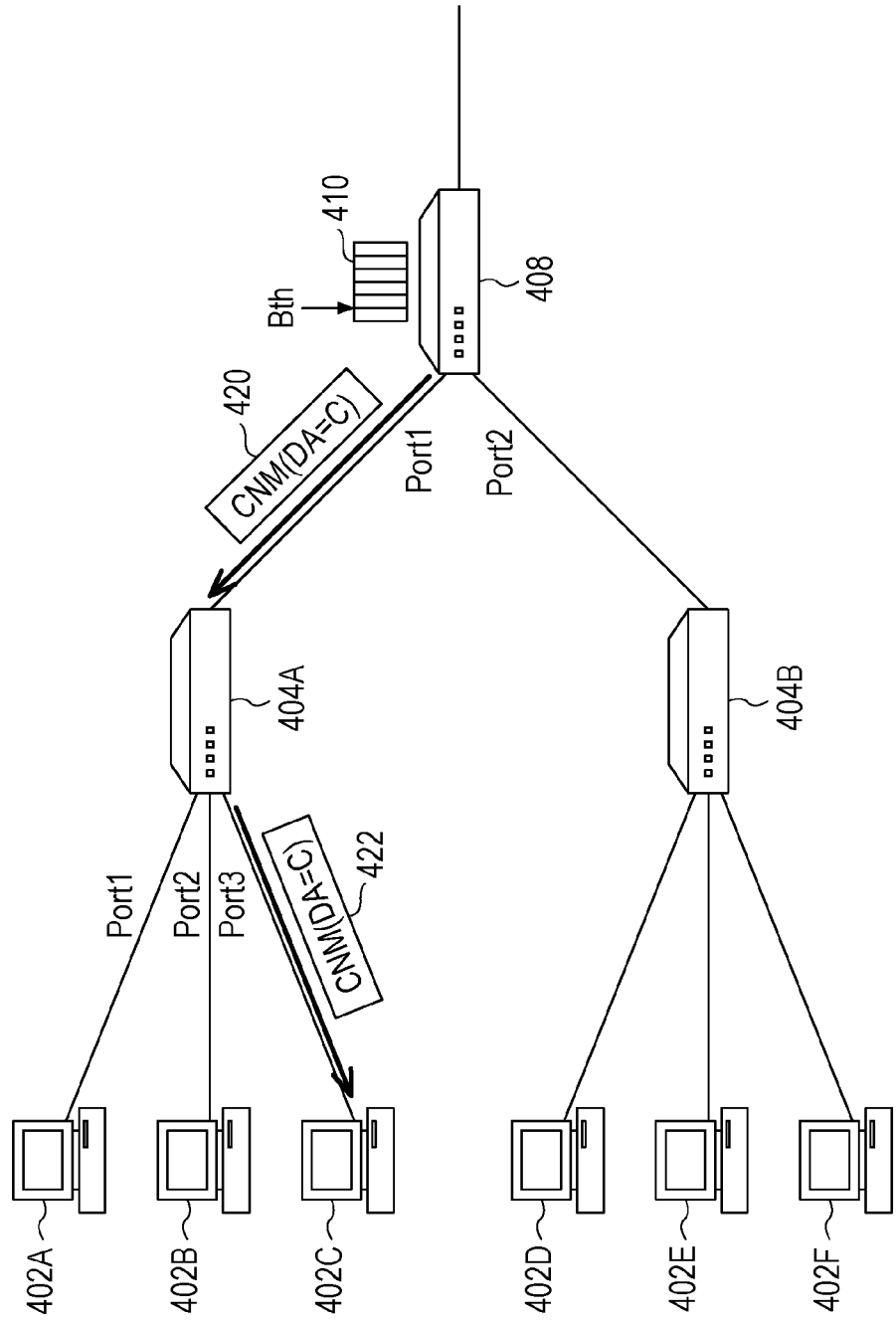
FIG. 4 is a schematic diagram illustrating an example of a congestion notification method.

Next, referring to FIG. 4, a congestion notification method is described. FIG. 4 illustrates a plurality of servers 402A through 402F, switches 404A and 404B to accommodate the plurality of servers 402A through 402C and 402D through 402F, respectively, and a switch 408 to aggregate the switches 404A and 404B. In the configuration of FIG. 4, consideration is given to a case that the switch 408 detects that congestion occurs in a frame buffer 410 of the switch 408. At this time, when a transmission source of the frame that is extracted from the frame buffer 410 is the server 402C, the switch 408 generates a CNM using the server 402C as a destination for transmission. Then, the CNM is relayed at the switch 404A and is transferred to the server 402C.

However, such extraction of a frame is applied only to a predetermined number of frames or a predetermined ratio of frames among the frames that are accumulated in the frame buffer, and does not consider a traffic volume and a transmission rate that are involved in each of the servers 402A through 402F. Accordingly, the transmission rate of the server 402C may be low compared with other servers 402A, 402B, and 402D through 402F. In such a case, there is a possibility that the volume of traffic inhibition by the server 402C that has received the CNM is very small compared with the traffic volume involved in other servers 402A, 402B, and 402D through 402F and the congestion that occurs in the switch 408 may not be resolved.

Figure 5:
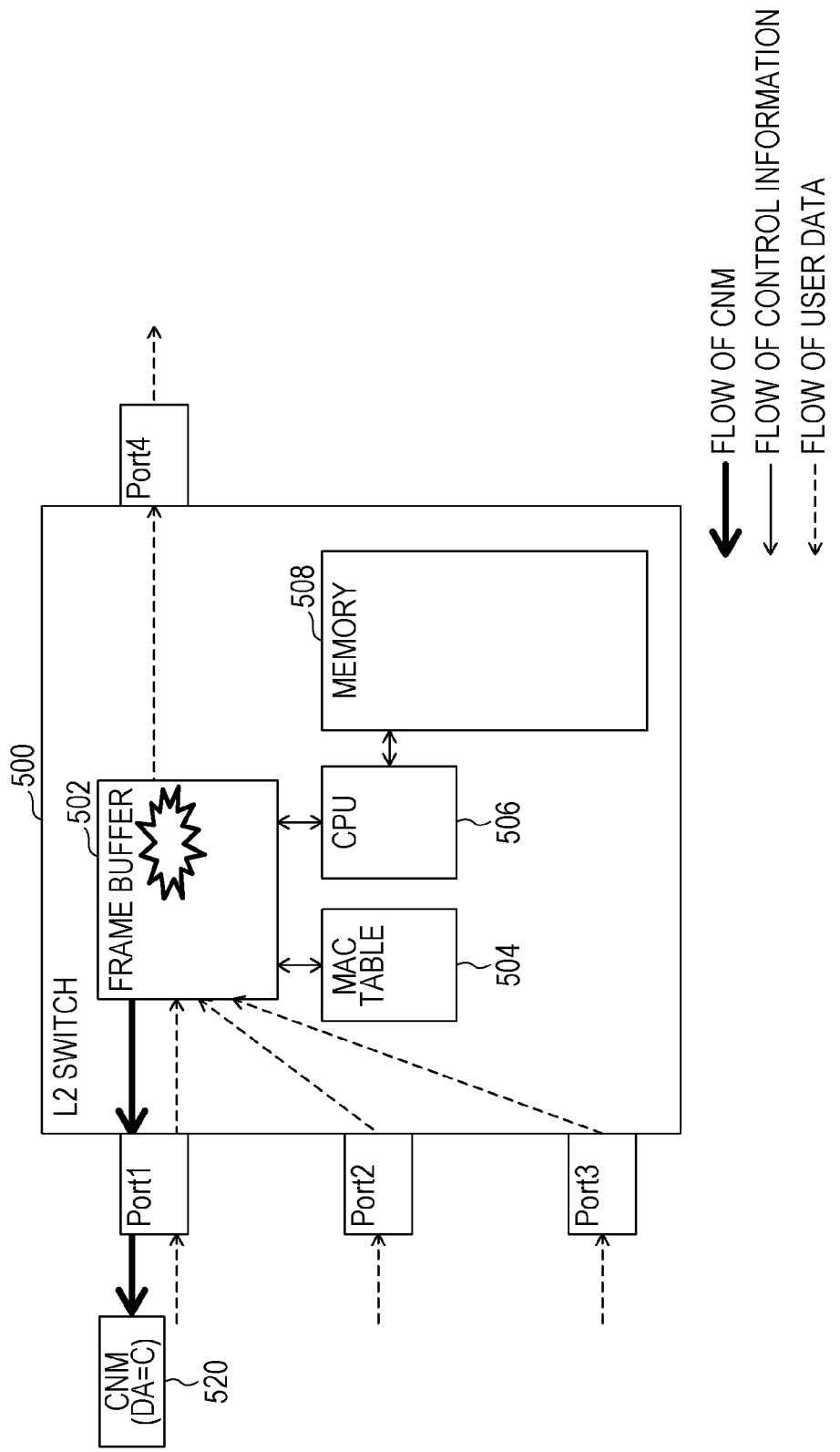
FIG. 5 is a schematic diagram illustrating an example of an operation of a switch when generating a CNM.

Next, how the congestion notification method described above is carried out in each switch is described in detail. FIG. 5 is a diagram illustrating an example of behaviors of a switch when generating a CNM. An L2 switch 500 corresponds to the switch 408 that has detected congestion in FIG. 4. The L2 switch 500 has four ports 1 through 4, a frame buffer 502, a MAC table 504, a CPU 506, and a memory 508.

In FIG. 5, as illustrated with broken line arrows, a frame that conveys user data is inputted from the plurality of ports 1 through 3, accumulated in the frame buffer 502, and sequentially transmitted from the port 4. The CPU 506 monitors the number of frames that are accumulated in the frame buffer 502 and determines that the L2 switch 500 enters a congestion state, when the number of accumulated frames exceeds a predetermined threshold.

In a case of determining that the L2 switch 500 enters a congestion state, the CPU 506 generates a CNM and accumulates the CNM in the frame buffer 502 to transmit the CNM via a port. Here, a destination of the CNM is set at a transmission source address of the frame that is extracted from the frame buffer 502 when the L2 switch 500 enters a congestion state. In the example of FIG. 5, a destination address (DA) of the CNM is set at C and the CNM is transmitted via the port 1 as illustrated with thick arrows.

Extraction of a frame is carried out by extracting a predetermined number of frames, such as several frames and more than ten frames, or a predetermined ratio of frames, such as 5% and 10%, among the frames that are accumulated in the frame buffer 502. The CPU 506 sets transmission source addresses that are included in these limited frames as the destination addresses of the CNM.

A destination of the CNM that is set as described above may not necessarily send out more traffic compared with other transmission sources. This is because, when carrying out determination of a congestion state, in a case that a frame from a transmission source that sends out a small traffic volume is accidentally accumulated in the frame buffer 502, the transmission source turns out to be selected as a destination of the CNM. In this way, when a CNM is sent to a transmission source that sends out a small traffic volume, so as to inhibit the traffic volume to be sent out, the traffic volume that flows in the switch 500 does not decrease much and the congestion may not be resolved.

Figure 6:
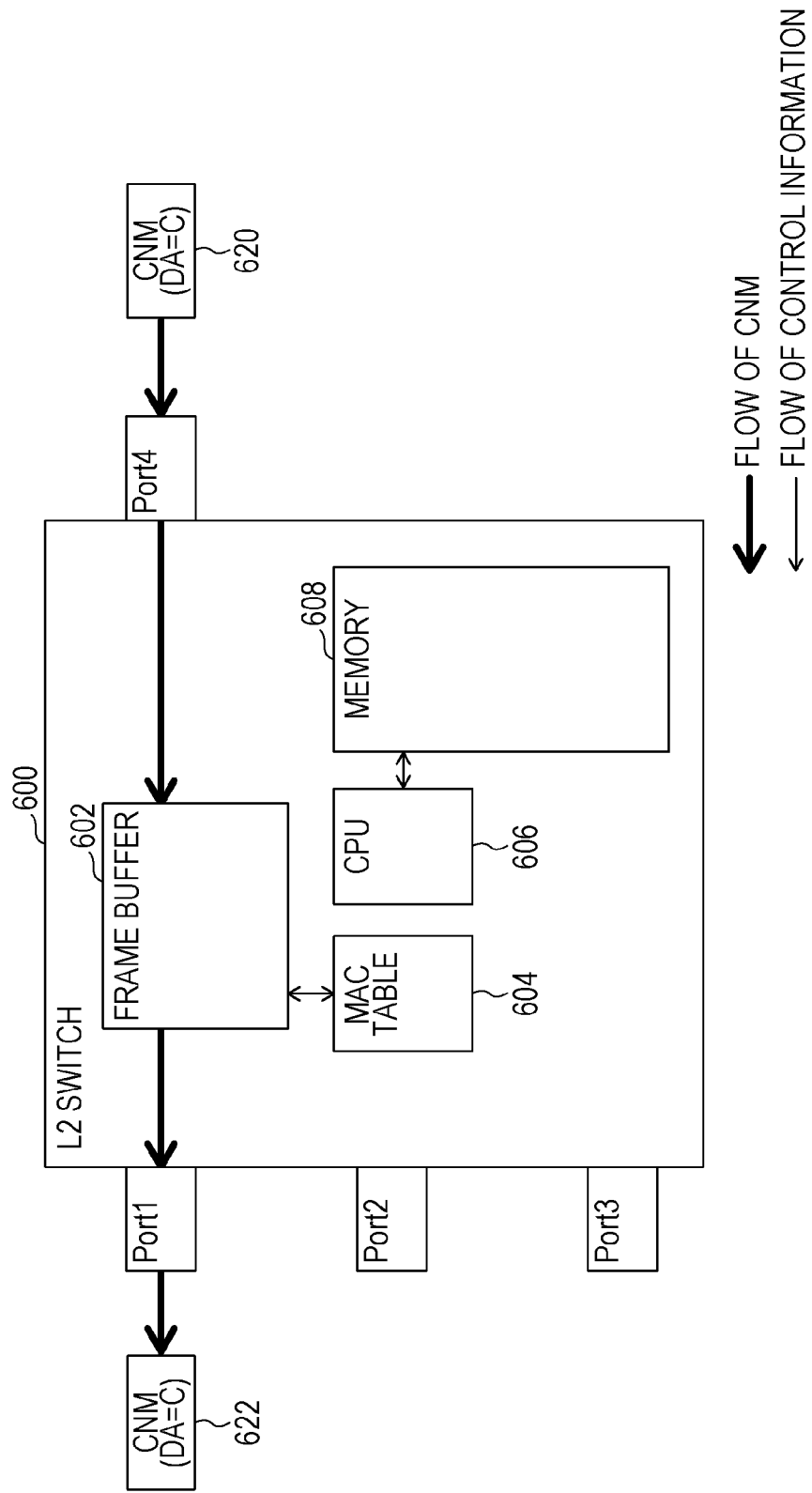
FIG. 6 is a schematic diagram illustrating an example of an operation of a switch when relaying a CNM.

The congestion notification method is also carried out in a relay switch. FIG. 6 is a diagram illustrating an example of operations of a switch when relaying a CNM. An L2 switch 600 corresponds to the switch 404A that relays a CNM in FIG. 4. The L2 switch 600 includes four ports 1 through 4, a frame buffer 602, a MAC table 604, a CPU 606, and a memory 608.

In FIG. 6, a flow of a CNM is illustrated with thick arrows. The L2 switch 600 receives a CNM 620 that has a destination address (DA)=C as described in FIG. 6, for example, via the port 4. The CNM thus received is accumulated in the frame buffer 602, undergoes MAC learning, and is forwarded, in a manner similar to normal data frames. That is, the CNM 620 that is received via the port 4 is transmitted from the port 1 as a CNM 622 having the destination address (DA)=C.

In this way, since the switch 600 relaying a CNM simply forwards the CNM thus received, there still remains the problem that has occurred in the switch 500 generating a CNM.

Further, since the L2 switch 500 in FIG. 5 generates a CNM based only on a situation in the device of the L2 switch 500 and the L2 switch 600 in FIG. 6 simply forwards the CNM thus received, consideration is not given to a situation of a transmission source that is connected via cascade connected switches. Accordingly, there may be problem that a destination of the CNM that has been generated and forwarded is different from a destination to which the CNM is to be primarily transmitted, that is, the transmission source that has a more transmission traffic volume and is causing the congestion.

In addition, in recent years, there are increasing requests for lossless traffic in data centers. For example, in FCoE traffic, since fiber channel (FC) that is originally lossless is operated on Ethernet premised on frame loss, lossless Ethernet is desired. In the existing CN, a CNM is sent after congestion occurs as described above with reference to FIGS. 4, 5, and the like, so as to attempt to avoid congestion. However, there is a problem that frame loss turns out to occur during a time period from congestion occurrence to avoidance thereof.

<Outline of Method of Avoiding Congestion>

Figure 7:
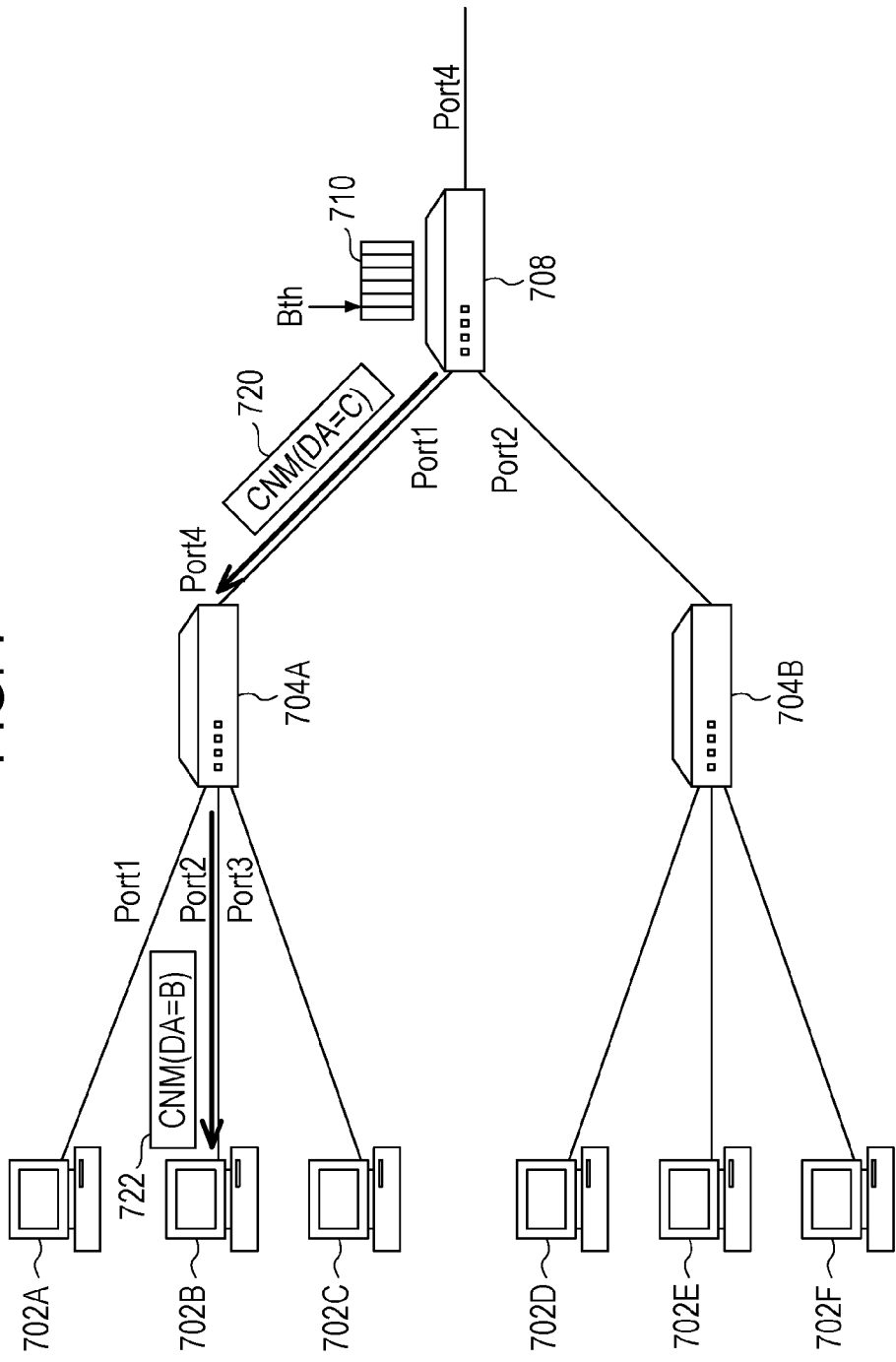
FIG. 7 is a schematic diagram illustrating an example of a method of avoiding congestion, according to an embodiment.

Referring to FIG. 7, an outline of a method of avoiding congestion according to an embodiment is described. The configuration of FIG. 7 is similar to the configuration of FIG. 4. FIG. 7 illustrates a plurality of servers 702A through 702F, switches 704A and 704B that accommodate the plurality of servers 702A through 702C and 702D through 702F, respectively, and a switch 708 that aggregates the switches 704A and 704B. In the configuration of FIG. 7, consideration is given to a case that the switch 708 detects occurrence of congestion in a frame buffer 710 of the switch 708.

When the number of frames that are accumulated in the frame buffer 710 of the switch 708 becomes more than a predetermined threshold Bth, the switch 708 determines that a congestion state has occurred, generates a CNM, and transmits the generated CNM. At this time, a destination of the CNM is not set at a transmission source address of the frame extracted from the frame buffer 710 but is determined based on statistical information of respective ports (ports 1, 2, and 4) provided for the switch 708.

That is, the switch 708 identifies a port via which the frame causing the detected congestion is received. In this way, even without analyzing the frame, it is possible to identify a port via which the frame causing the congestion is received.

Any information representing a traffic volume for each port may be used as the statistical information. For example, the traffic volume may also be a reception rate that is obtained by counting the number of frames, bits, bytes, or the like per unit time. Alternatively, the order of reception rate among all ports of the switch or the classification, such as high/medium/low, may be used as the traffic volume.

In a case that the reception rate of the port 1 is higher than those of the ports 2 and 4 as a result of examining the statistical information by the switch 708, the switch 708 defines that a CNM is to be transmitted from the port 1 that has the highest reception rate and determines the servers 702A, 702B, and 702C that are assigned to the port 1 as the destinations of the CNM.

As an alternative, the statistical information may be information representing a traffic volume for each MAC address that is assigned to the port. When the reception rate of the server 702C related to a MAC address (C) is higher than those of other MAC addresses as a result of examining the statistical information by the switch 708, the switch 708 determines the MAC address (C) that has the highest reception rate, that is, the server 702C, as the destination of the CNM.

In this way, the switch 708 determines the destination of the CNM based on the statistical information so that the CNM is transmitted to the transmission source that has actually sent out so much traffic to cause the congestion. Accordingly, it is possible to certainly avoid congestion, compared with a case where the destination of the CNM is set at the transmission source of a frame that is staying in the frame buffer at the occurrence of congestion.

<Device for Generating CNM>

Next, how a switch generates a CNM is described.

Figure 8:
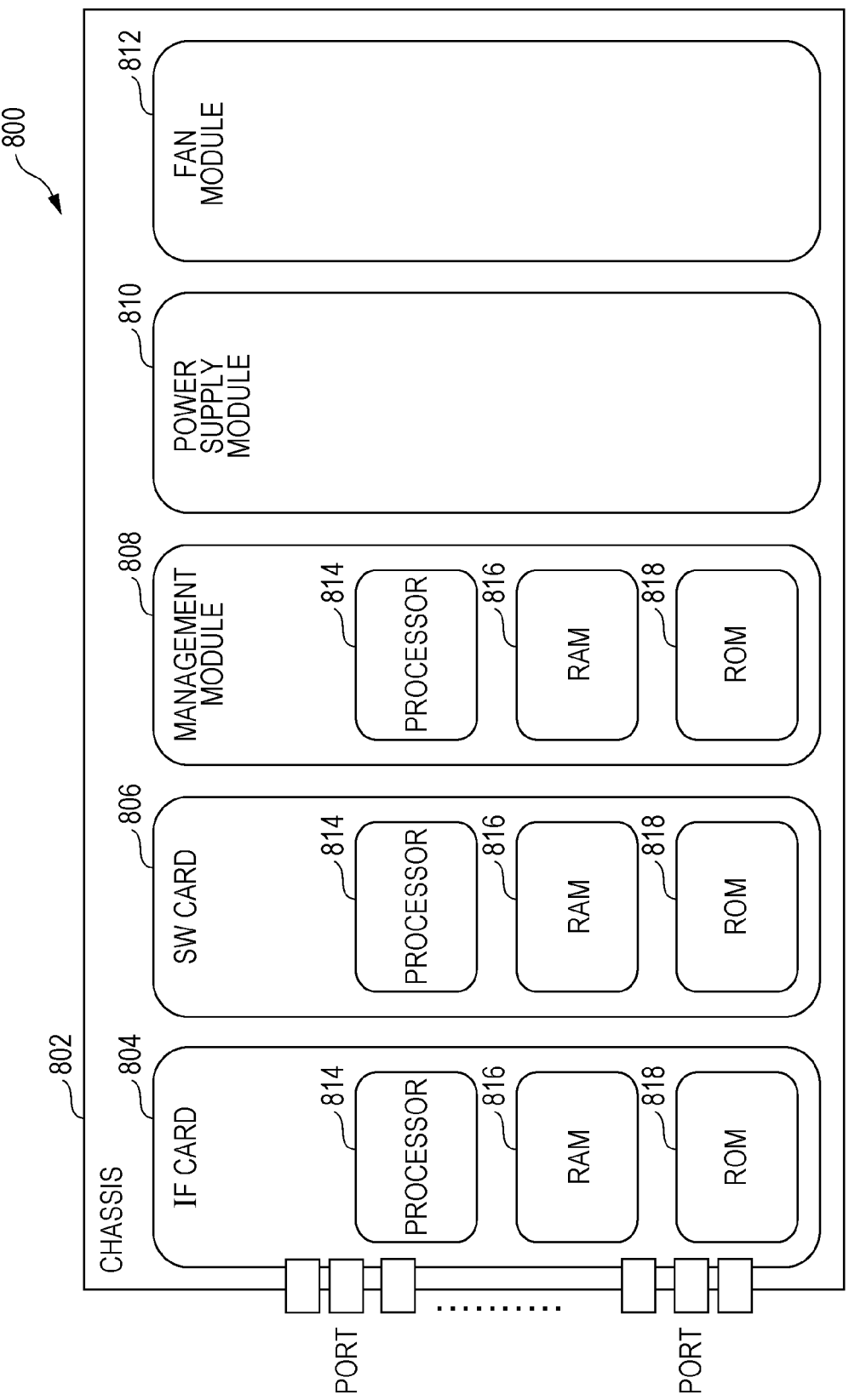
FIG. 8 is a diagram illustrating an example of a hardware configuration of a switch, according to an embodiment.

FIG. 8 is a diagram illustrating an example of a hardware configuration of a switch, according to an embodiment.

A switch 800 includes a chassis 802 provided with cards 804 through 812.

The chassis 802 is a housing that accommodates each card.

The interface (IF) card 804 is a card that carries out transmission and reception process when communicating over a specific network. For example, the IF card 804 may be used to carry out transmission and reception process for making a connection to Ethernet. For example, the IF card 804 is equipped with a processor 814, a RAM 816, a ROM 818, and the like.

The SW card 806 is a card that has a packet exchange (switching) function.

The management module 808 has a function to manage each card.

The power supply module 810 is a supply source of the power for the switch to operate.

The fan module 812 has a cooling function to avoid damage to components due to an abnormal temperature rise.

A CNM may be generated by a device that implements the cards as described above.

Figure 9:
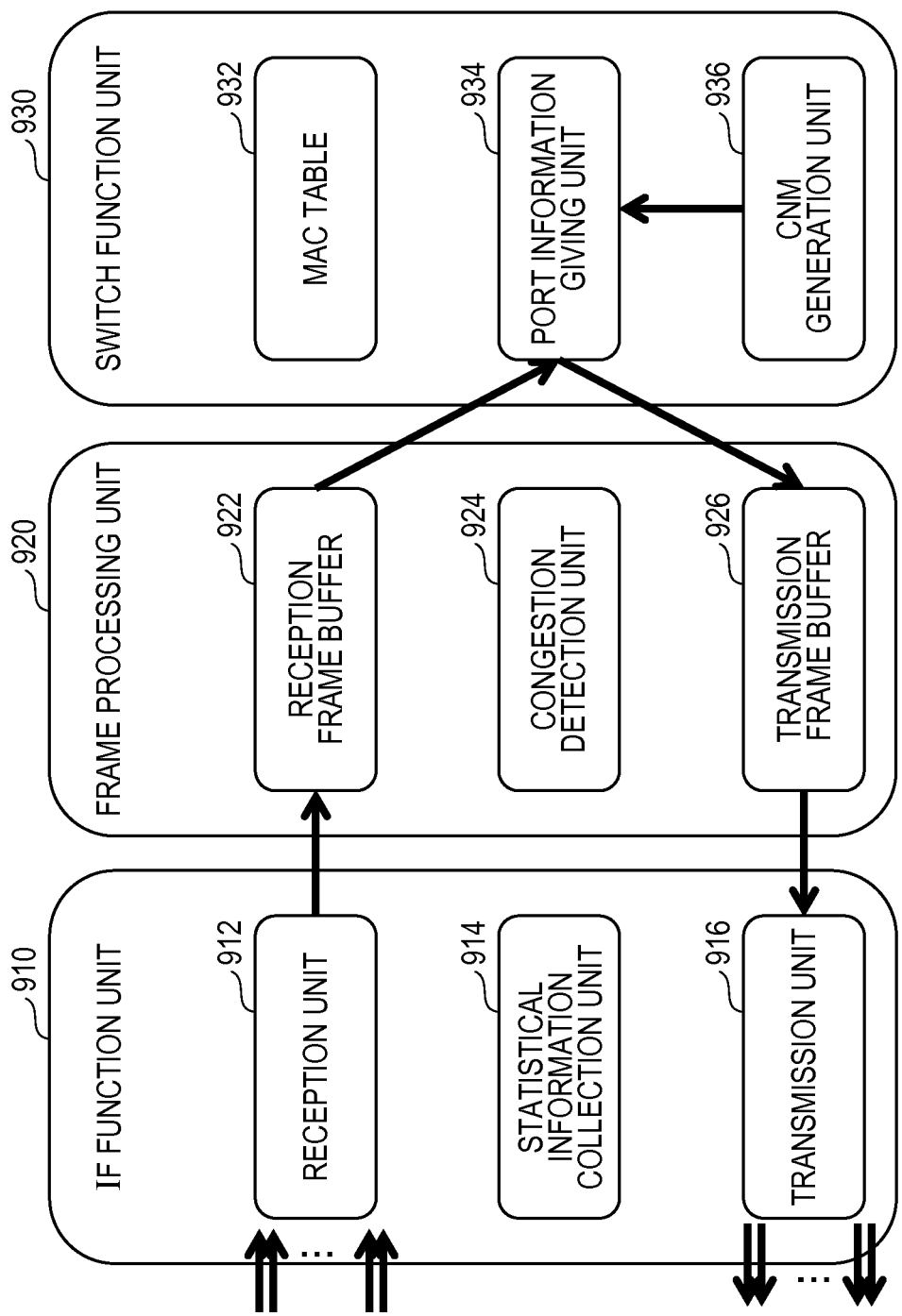
FIG. 9 is a diagram illustrating an example of a functional configuration of a switch that generates a CNM, according to an embodiment.

FIG. 9 is a diagram illustrating an example of a functional configuration of a switch generating a CNM, according to an embodiment. FIG. 9 illustrates functions that are performed by causing the processor 814 mounted in each card of the switch 800 according to an embodiment, to execute a program that is stored in the RAM 816 and the ROM 818.

The switch 800 has an interface (IF) function unit 910, a frame processing unit 920, and a switch function unit 930.

The IF function unit 910 and the frame processing unit 920 represent a function that is implemented by causing the processor 814 of the IF card 804 to execute a program and the like that are stored in the RAM 816 or the ROM 818, and the switch function unit 930 represents a function that is implemented by causing the processor 814 of the SW card 806 to execute a program that is stored in the RAM 816 or the ROM 818.

The IF function unit 910 executes frame transmission and reception process. The IF function unit 910 includes a reception unit 912, a statistical information collection unit 914, and a transmission unit 916.

The reception unit 912 stores a frame that is received via each port into a reception frame buffer 922.

The statistical information collection unit 914 monitors a frame that is received via each port, obtains the statistical information, and notifies a congestion detection unit 924 of the obtained statistical information, as needed. The statistical information may be, for example, the number of received frames that have passed through the port per unit time.

The transmission unit 916 outputs frames that are stored in a transmission frame buffer 926 to a relevant port.

Next, the frame processing unit 920 converts a frame format. The frame processing unit 920 includes the reception frame buffer 922, the congestion detection unit 924, and the transmission frame buffer 926.

When the number of frames staying in the reception frame buffer 922 exceeds a threshold, the congestion detection unit 924 notifies a port information giving unit 934 of a port that has been determined based on the statistical information collected by the statistical information collection unit 914. For example, the congestion detection unit 924 notifies the port information giving unit 934 of a port that has the highest reception rate.

As mentioned above, the congestion detection unit 924 detects an occurrence of congestion using the number of frames in the reception frame buffer 922, and further identifies a port via which the frame causing the congestion is received, based on a reception rate of each port.

In addition, the congestion detection unit 924 notifies a CNM generation unit 936 that the congestion has been detected.

The switch function unit 930 determines a port to which the received frame is to be output. The switch function unit 930 includes a MAC table 932, the port information giving unit 934, and the CNM generation unit 936.

The MAC table 932 stores, for example, an address in association with port information identifying each port.

The port information giving unit 934 analyzes a destination or a source of the received frame and searches the MAC table 932 using the address as a key so as to obtain the port information that corresponds to the address. Then, the port information thus obtained is added to the frame which is stored in the transmission frame buffer 926. Upon detecting congestion, the port information giving unit 934 adds information notified by the congestion detection unit 924 and identifying a port having the highest reception rate, to a CNM generated by the CNM generation unit 936, and the CNM provided with the information is stored in the transmission frame buffer 926.

The port information giving unit 934 searches the MAC table 932 for a MAC address associated with the port that has the highest reception rate and is notified by the congestion detection unit 924, and the port information giving unit 934 sets the MAC address as a destination of the CNM generated by the CNM generation unit 936.

Upon being notified of detection of congestion from the congestion detection unit 924, the CNM generation unit 936 generates a CNM for notifying occurrence of congestion. The CNM generation unit 936 sends the generated CNM to the port information giving unit 934.

The transmission unit 916 sequentially outputs the frames that are stored in the transmission frame buffer 926 to the port identified by the port information.

The congestion detection unit 924 may also be configured to determine, not limited to a port that has the highest reception rate, as an alternative, a predetermined number of ports that have higher reception rates, such as top two or five ports. Alternatively, the congestion detection unit 924 may also be configured to determine one or more ports that have reception rates higher than a predetermined value.

Further as an alternative, the MAC table 932 may also be configured to store statistical information in association with each MAC address. The statistical information that is stored in the MAC table 932 is updated periodically, such as every minute and every hour, for example, based on the statistical information that is held in the statistical information collection unit 914.

In this alternative example, instead of determining a port by referring to the statistical information collection unit 914, the congestion detection unit 924 may also determine a MAC address that has the highest reception rate by comparing pieces of statistical information for respective MAC addresses stored in the MAC table 932. Alternatively, a MAC address that has the highest reception rate may also be determined by the port information giving unit 934, instead of the congestion detection unit 924, referring to the MAC table 932.

As an alternative, not limited to a MAC address that has the highest reception rate, a predetermined number of MAC addresses that have higher reception rates, such as top two or five MAC addresses, may also be determined. Alternatively, MAC addresses that have reception rates higher than a predetermined value may also be determined.

As mentioned above, since a port causing congestion is determined without analyzing a frame, it is possible to avoid frame loss that may occur during frame analysis.

By adding statistical information to the MAC table 932 as described above, the port information giving unit 934 may determine a destination of the CNM only by referring to the MAC table 932. Accordingly, it is unnecessary to provide a new table for associating the statistical information with a port or a MAC address.

According to the embodiment, since a CNM is transmitted from a port that is actually involved in the congestion, it is possible to certainly avoid congestion.

<CNM Relaying Device>

Next, how a switch relays a CNM is described.

A diagram illustrating a hardware configuration of a switch that relays a CNM according to an embodiment is similar to a diagram illustrated in FIG. 8. A CNM may be relayed by the switch 800 illustrated in FIG. 8.

Figure 10:
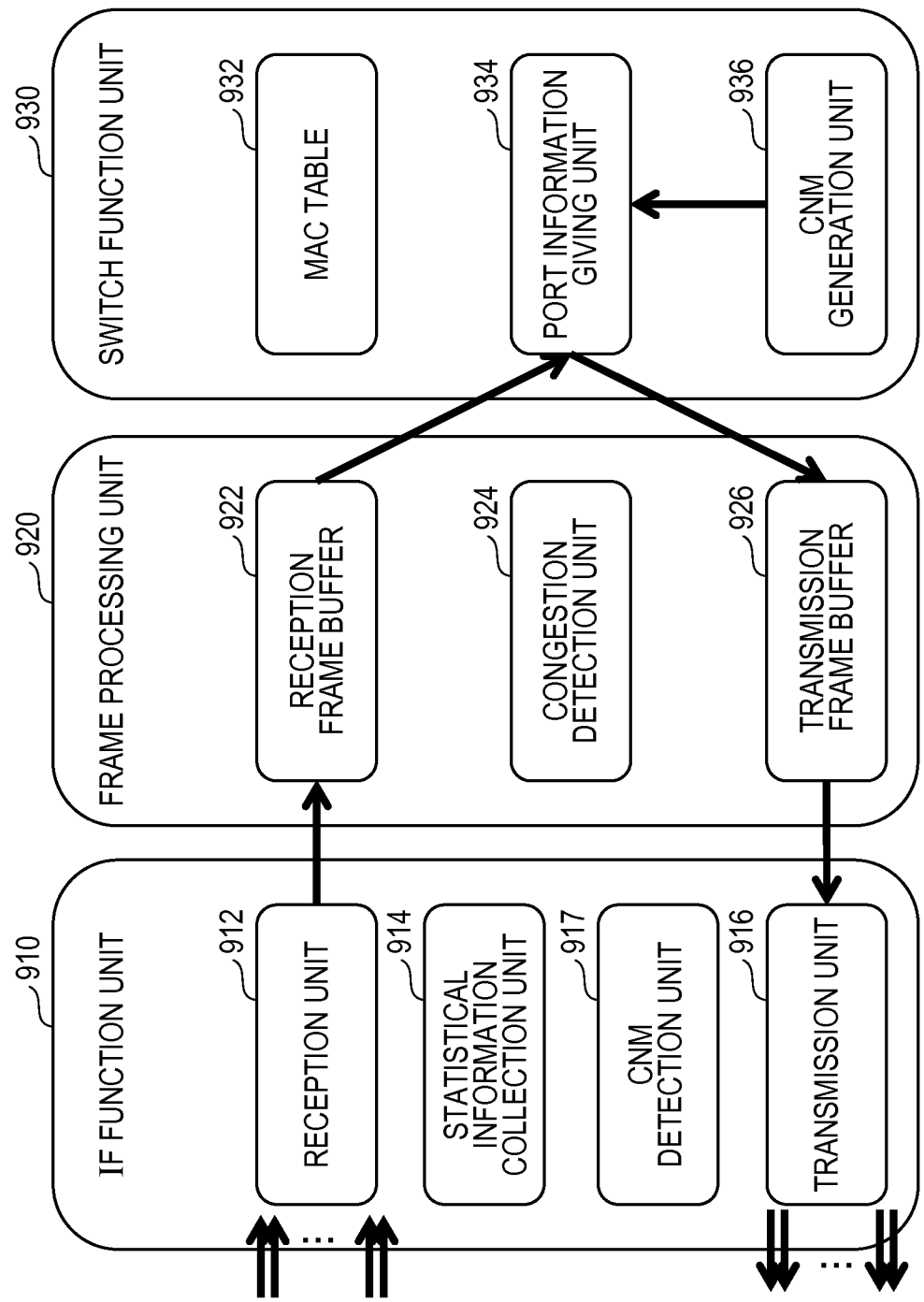
FIG. 10 is a diagram illustrating an example of a functional configuration of a switch that relays a CNM, according to an embodiment.

FIG. 10 is a diagram illustrating an example of a functional configuration of a switch relaying a CNM, according to an embodiment. FIG. 10 illustrates functions that are implemented by causing the processor 814 mounted in each card of the switch 800 according to an embodiment, to execute a program stored in the RAM 816 or the ROM 818.

In FIG. 10, in addition to the functional blocks in FIG. 9, the IF function unit 910 further includes a CNM detection unit 917. Other functional blocks are similar to those in FIG. 9 and repetitive descriptions are omitted here.

The CNM detection unit 917 detects reception of a CNM by monitoring a frame that is inputted via each port. The CNM detection unit 917 notifies the congestion detection unit 924 that the CNM is received. The received CNM is stored in the reception frame buffer 922.

Upon being notified of reception of the CNM from the CNM detection unit 917, the congestion detection unit 924 notifies the port information giving unit 934 of a port that has been determined based on the statistical information collected by the statistical information collection unit 914. For example, the congestion detection unit 924 notifies the port information giving unit 934 of the port that has the highest reception rate.

As mentioned above, when a CNM is detected, the congestion detection unit 924 determines a port via which the frame causing the congestion is received, based on the reception rate of each port.

The port information giving unit 934 adds information on the port having the highest reception rate and determined by the congestion detection unit 924, to a CNM that is read out from the reception frame buffer 922, and stores the CNM provided with the information into the transmission frame buffer 926.

Here, the port information giving unit 934 searches the MAC table 932 for a MAC address associated with the port that is determined by the congestion detection unit 924. In the case, when the obtained MAC address is different from the destination address contained in the received CNM, the port information giving unit 934 rewrites the destination address of the CNM to the MAC address associated with the port that is determined by the congestion detection unit 924.

As an alternative, the congestion detection unit 924 may also be configured to determine a predetermined number of ports that have higher reception rates or one or more ports that have reception rates higher than a predetermined value, as described above.

Further as an alternative, the MAC table 932 may also be configured to store the statistical information for each MAC address, as described above.

Then, the CNM that has the destination rewritten as described above is accumulated in the transmission frame buffer 926 in a manner similar to other frames and is transmitted via the port by the transmission unit 916.

As mentioned above, since a port causing the congestion is determined without analyzing a frame in a switch that relays a CNM as well, it is possible to avoid frame loss that might occur during frame analysis.

As described above, the switch 800 rewrites a destination of the CNM based on the statistical information so that the CNM is transferred to a transmission source that is actually sending out so much traffic to cause the congestion. This allows the switch 800 to transfer the CNM to the transmission source that is actually sending out so much traffic even in a case of receiving a CNM that is generated, during congestion in another switch, based on a frame staying in a frame buffer of the other switch. That is, the switch 800 is capable of transferring a CNM to a transmission source causing congestion even in a network where a plurality of switches are cascade connected, and is capable of certainly avoiding congestion.

Further, in a network where the switches 800 of the embodiment are cascade connected, a destination of the CNM is repeatedly continued to be updated so that a transmission source that is actually causing the congestion is determined as a destination. Accordingly, congestion may be avoided certainly compared with a case of simply transferring a received CNM as is.

In addition, a switch may also be configured to be provided with both functions of FIGS. 9 and 10.

<Application to Lossless Traffic/Overview of FIP Sequence>

As described above with reference to FIGS. 4, 5, and the like, in the existing CN, since a CNM is transmitted after congestion has occurred, frame loss turns out to occur between occurrence of the congestion and avoidance thereof, and it is difficult to ensure lossless traffic that is demanded increasingly in recent years. Accordingly, it is very useful to avoid congestion that might occur in the future before it happens.

While FCoE is taken as an example of lossless traffic for explanation in the embodiments, the embodiments are also applicable to any other lossless traffic.

Figure 11:
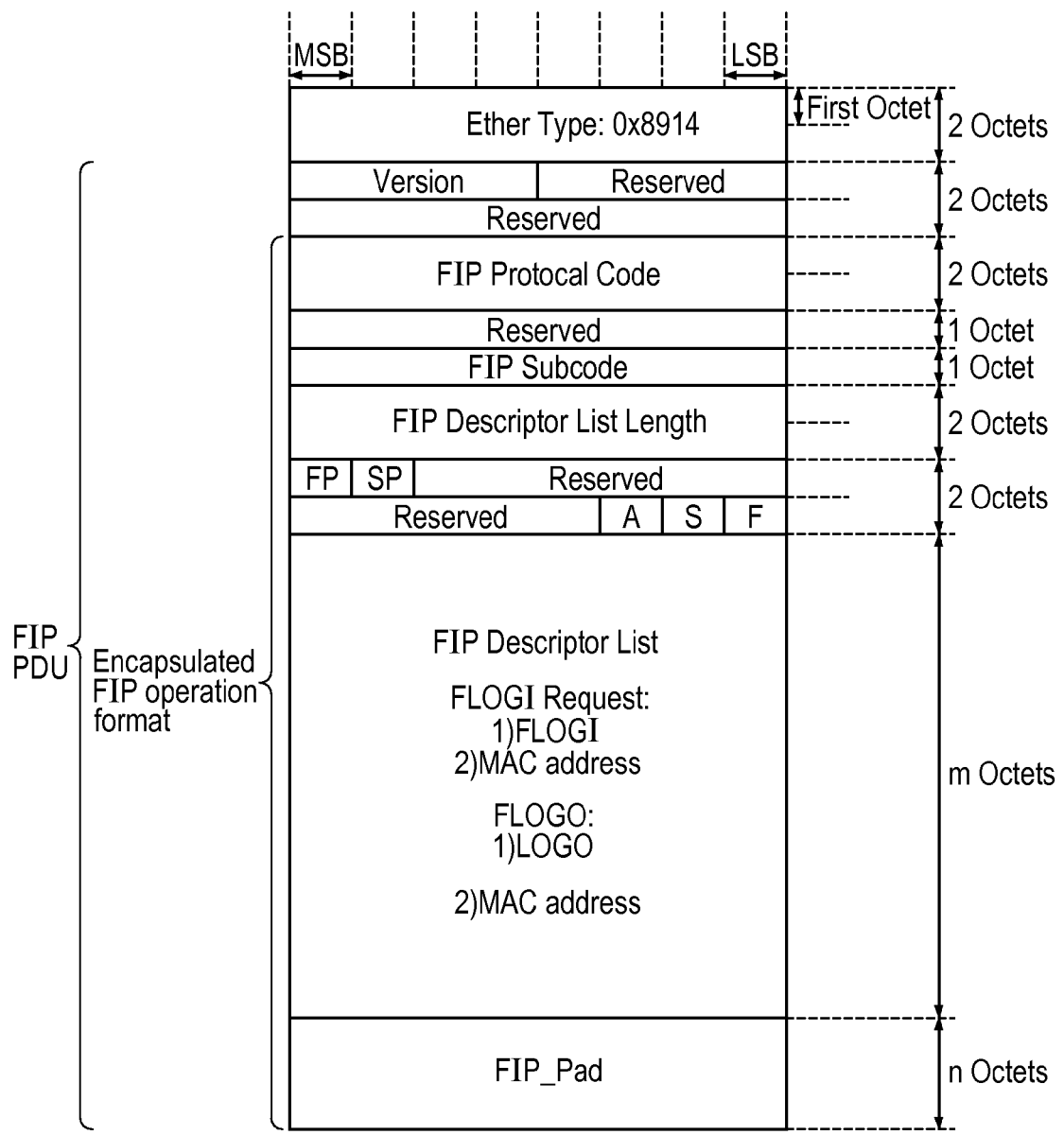
FIG. 11 a diagram illustrating an example of a format of a fiber channel over Ethernet initialization protocol (FIP) frame.

Normally, before lossless traffic to be ensured is transmitted, an initialization protocol that is unique to the lossless traffic is executed. For example, in a case of FCoE, FIP is used. An FIP frame is transferred in accordance with an Ethernet frame format illustrated in FIG. 2, and an EtherType (ET) field is set at 0x8914. FIG. 11 represents a case that 0x8914 is set to an Er in FIG. 2, that is, a frame format of FIP frame. For simplicity, FIG. 11 represents a portion of a field area starting from the EtherType field in FIG. 2.

Figure 12:
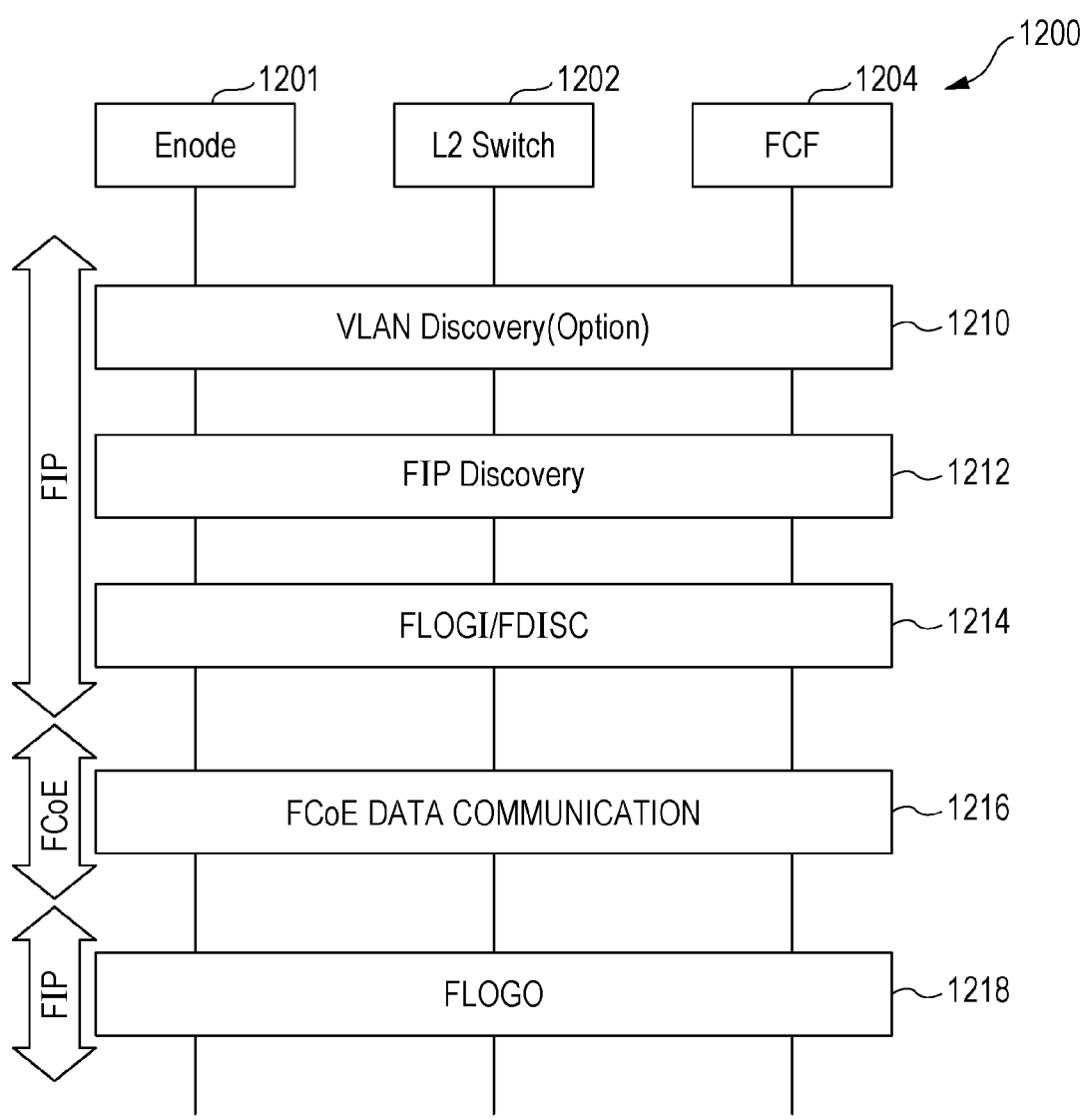
FIG. 12 is a diagram illustrating an example of an FIP sequence.

Next, referring to FIG. 12, descriptions are given of an FIP sequence 1200. The FIP sequence 1200 is executed via an L2 switch 1202 between an Enode 1201 and a fiber forwarder (FCF) 1204. The Enode 1201 is equivalent to, for example, the server 102 in FIG. 1, the servers 402A through 402F in FIG. 4, or the servers 702A through 702F in FIG. 7. The L2 switch 1202 may or may not be provided with an FCF function. In the case that the L2 switch 1202 is not provided with an FCF function, existence of another switch provided with the FCF function in the network is sufficient.

In operational step 1210, the Enode 1201 finds a VLAN that transmits and receives FCoE or FIP traffic (VLAN Discovery). This operational step is optional. In operational step 1212, the Enode 1201 searches for a switch provided with an FCF function to which the Enode 1201 itself is connectable, by utilizing multicast over Ethernet (FIP Discovery). In response, the FCF 1204 returns a MAC address of the FCF 1204 to the Enode 1201 in unicast communication. Next, in operational step 1214, the Enode 1201 connects with the FCF 1204 using the MAC address received from the FCF 1204 and carries out fabric login and fabric discovery to establish a virtual link with the FCF 1204 (FLOGI/FDISC). By the login, initialization of the FCoE is finished.

After initialization of FCoE, in operational step 1216, data communication by means of FCoE is performed.

In operational step 1218, the Enode 1201 executes logout to finish connection with the FCF 1204.

<Application to Lossless Traffic/Case of Detecting FIP Frame>

Next, how a switch avoids congestion prior to lossless traffic communication is described. While FCoE is taken as an example of lossless traffic for explanation in the embodiments, the embodiments are also applicable to any other lossless traffic.

A hardware configuration of a switch that avoids congestion prior to lossless traffic communication according to an embodiment is similar to that illustrated in FIG. 8. The switch 800 illustrated in FIG. 8 may be configured to avoid congestion prior to lossless traffic communication.

Figure 13:
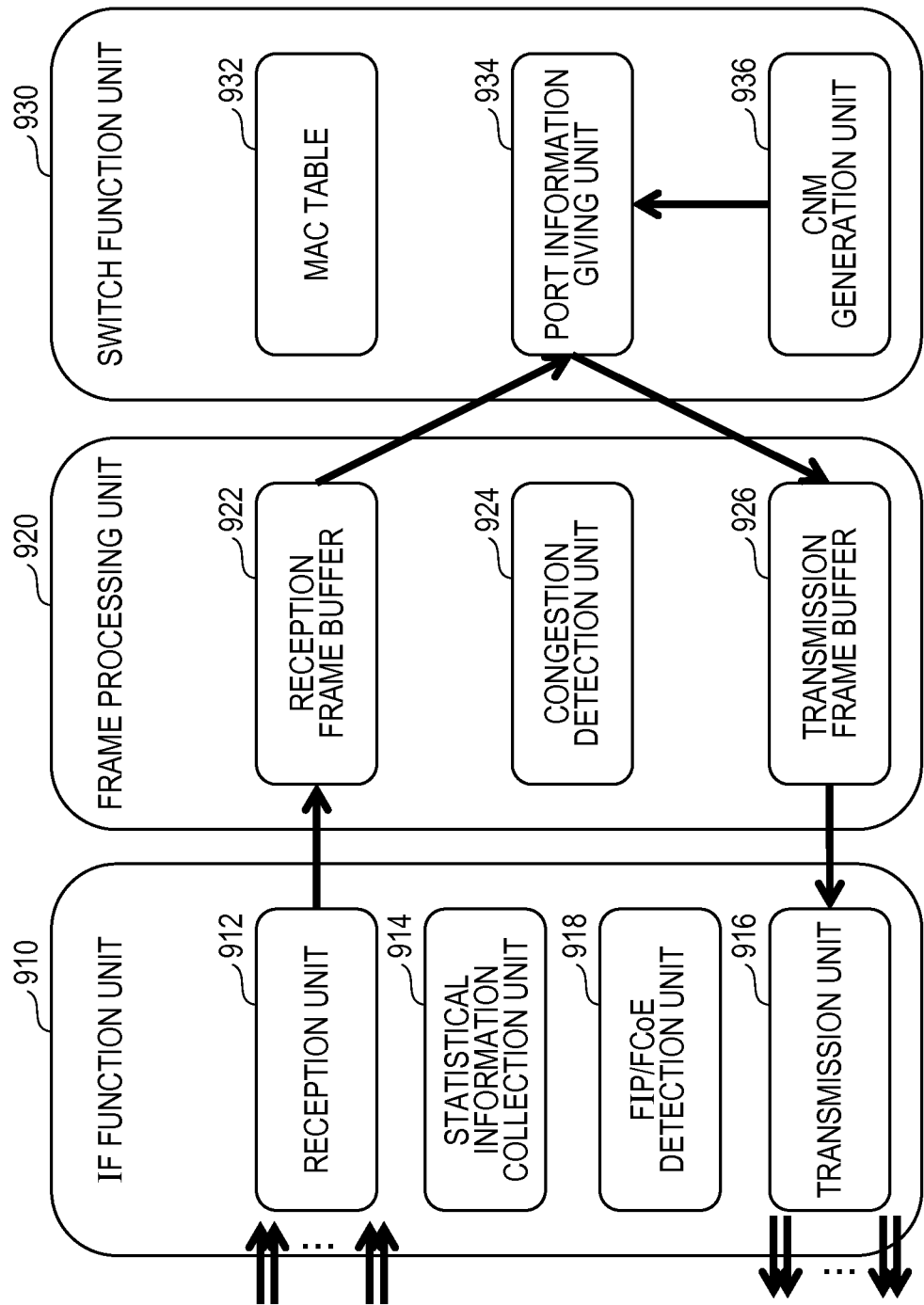
FIG. 13 is a diagram illustrating an example of a functional configuration of a switch that avoids congestion prior to lossless traffic communication, according to an embodiment.

FIG. 13 is a diagram illustrating an example of a functional configuration of a switch that avoids congestion prior to lossless traffic communication, according to an embodiment. FIG. 13 illustrates functions that are implemented by causing the processor 814 mounted in each card of the switch 800 according to an embodiment, to execute programs stored in the RAM 816 and the ROM 818.

In FIG. 13, in addition to the functional blocks in FIG. 9, the IF function unit 910 further includes an FIP/FCoE detection unit 918. Other functional blocks are similar to those in FIG. 9 and repetitive descriptions are omitted here.

The FIP/FCoE detection unit 918 monitors frames that are inputted from each port to detect that an FIP frame is received.

All FIP frames that are inputted from the respective ports are forwarded to the reception frame buffer 922. Next, information that identifies a port from which the FIP frames are to be transmitted and is determined by the switch function unit 930 is added to the FIP frames which are accumulated in the transmission frame buffer 926. Then, the FIP frames accumulated in the transmission frame buffer 926 are sequentially transmitted from the port similar by the transmission unit 916 in a manner similar to other frames.

Further, the FIP/FCoE detection unit 918 analyzes the received FIP frames. For example, the FIP/FCoE detection unit 918 determines one of operational steps illustrated in FIG. 12 in which the received FIP frame is currently processed, based on the values set in the respective fields of FIP protocol code, FIP subcode, and FIP descriptor of the received FIP frame which are illustrated in FIG. 11. For example, in the case of FIP protocol code=0001h and FIP subcode=01h or 02h, it is determined that the received FIP frame is one being processed in operational step 1212 (FIP Discovery) of FIG. 12. In addition, in the case of FIP protocol code=0002h, FIP subcode=01h or 02h, and FIP descriptor=7, it is determined that the received FIP frame is one being processed in operational step 1214 (FLOGI/FDISC) of FIG. 12.

For example, the FIP/FCoE detection unit 918 notifies the CNM generation unit 936 of the received FIP frame when it is determined that the received FIP frame is an FIP frame being processed in operational step 1214 (FLOGI/FDISC) of FIG. 12. Further, the FIP/FCoE detection unit 918 may also sends or notify the received FIP frame in operational step 1214 (FLOGI/FDISC) to the port information giving unit 934.

The CNM generation unit 936 generates a CNM in response to the notification from the FIP/FCoE detection unit 918 and sends the generated CNM to the port information giving unit 934.

The port information giving unit 934 sets, as a destination of the CNM received from the CNM generation unit 936, a MAC address other than the MAC addresses that are defined as the destination and the transmission source of the FIP frame obtained from the reception frame buffer 922 or the FIP/FCoE detection unit 918. That is, the destination of the CNM becomes a MAC address of an Enode (such as a server) that does not send and receive an FIP frame.

Then, the CNMs that are generated as described above are accumulated in the transmission frame buffer 926 in a manner similar to other frames and are sequentially transmitted from an appropriate port in accordance with association of ports with MAC addresses that is memorized in the MAC table 932.

The respective Enodes that have received these CNMs inhibit a traffic volume to be transmitted.

When the transmission and reception of lossless traffic is finished, that is, operational step 1216 (FCoE data communication) in FIG. 12 is finished, the CNM generation unit 936 stops generation of a CNM as described below.

Firstly, the FIP/FCoE detection unit 918 detects and analyzes an FIP frame in a procedure similar to the case of the FIP frame in operational steps 1210 through 1214 in FIG. 12.

Upon determining that a received FIP frame is an FIP frame in operational step 1218 (FLOGO) in FIG. 12, the FIP/FCoE detection unit 918 notifies the CNM generation unit 936 of the received FIP frame. Further, the FIP/FCoE detection unit 918 may also send or notify the received FIP frame in operational step 1218 (FLOGO) to the port information giving unit 934.

For example, in the case of FIP protocol code=0003h, FIP subcode=02h, and FIP descriptor=9, the received FIP frame is determined to be an FIP frame in operational step 1218 (FLOGO) in FIG. 12.

Since FIP frame in FLOGO indicates that FCoE data communication has been finished and the FIP sequence is to be finished, the CNM generation unit 936 stops the generation of a CNM.

Each Enode that previously received a CNM cancels inhibition of the traffic volume to be transmitted when reception of a CNM has been stopped.

As mentioned above, by detecting a frame that is being transmitted according to a predetermined protocol before lossless traffic is actually transmitted and received, it is possible to reduce load of the network before lossless traffic is actually transmitted and received and to acquire a sufficient bandwidth. Accordingly, it is possible to avoid congestion before it happens and to avoid frame loss before it happens, thereby allowing reliability of the network to be improved.

As an alternative, a CNM may also be generated only by a switch that is not provided with an FCF function. This allows the load of the switches provided with an FCF function to be reduced. This also reduces the number of CNMs that are transmitted and received over the network to a minimum, thereby improving the reliability of the network.

In addition, a switch may also be configured to be provided with all functions of FIGS. 9, 10, and 13.

<Application to Lossless Traffic/Case of Detecting FCoE Frame>

In addition to, or instead of, the case of detecting an FIP frame as described above, the switch 800 may also be configured to generate and transmit a CNM upon detecting an FCoE frame. Below, an embodiment of generating a CNM upon detection of an FCoE frame is described.

A hardware configuration and a functional configuration of a switch according to the embodiment are similar to those illustrated in FIGS. 8 and 13, respectively, and repetitive descriptions thereof are omitted here.

Firstly, the FIP/FCoE detection unit 918 monitors frames that are received via each port so as to detect an FCoE frame.

All FCoE frames that are received via the respective ports are forwarded to the reception frame buffer 922. Next, information determined by the switch function unit 930 and identifying a port from which the received FCoF frame is to be transmitted is added to the received FCoF frame which is accumulated in the transmission frame buffer 926. Then, the accumulated FCoE frames are sequentially transmitted from the port by the transmission unit 916 in a manner similar to other frames.

Further, the FIP/FCoE detection unit 918 analyzes the received FIP frame. For example, the FIP/FCoE detection unit 918 determines that the received FIP frame is an FCoE frame being processed in operational step 1216 (FCoE data communication) of FIG. 12 when value 0x8906 is set to the EtherType field of the Ethernet frame that is represented in FIG. 2.

The FIP/FCoE detection unit 918 notifies the CNM generation unit 936 of the received FIP upon determining that the received FIP frame is an FCoE frame being processed in operational step 1216 (FCoE data communication) of FIG. 12. Further, the FIP/FCoE detection unit 918 may also send or notify the received FCoE frame being processed in operational step 1216 (FCoE data communication) to the port information giving unit 934.

The CNM generation unit 936 generates a CNM in response to the notification from the FIP/FCoE detection unit 918 and sends the generated CNM to the port information giving unit 934.

The port information giving unit 934 sets, as a destination of the CNM received from the CNM generation unit 936, a MAC address other than the MAC addresses that are defined as the destination and the source of the FCoE frame obtained from the reception frame buffer 922 or the FIP/FCoE detection unit 918. That is, the destination of the CNM becomes a MAC address of an Enode (such as a server) that does not transmit and receive an FCoE frame.

Then, the CNMs generated as described above are accumulated in the transmission frame buffer 926 in a manner similar to other frames and are sequentially transmitted from an appropriate port in accordance with association of ports with MAC addresses that is memorized in the MAC table 932.

The respective Enodes that have received these CNMs inhibit a traffic volume to be transmitted.

The procedure to stop generation and transmission of a CNM is similar to the case of detecting an FIP frame.

As described above, detection of transmission and reception of lossless traffic allows the load of the network to be reduced as soon as lossless traffic is actually transmitted and received, thereby acquiring a sufficient bandwidth. Accordingly, it is possible to avoid congestion before it happens and to avoid frame loss before it happens, thereby improving reliability of the network.

In addition, a switch may also be configured to be provided with all functions of FIGS. 9, 10, and 13.

<Generation of CNM Based on VLAN>

In the embodiments described above, a destination MAC address of a CNM is determined based on statistical information for each port or MAC address. In an embodiment, statistical information for each VLAN may be memorized in a MAC table in addition.

A hardware configuration and a functional configuration of a switch according to the embodiment are similar to those illustrated in FIGS. 8 and 9, respectively, and repetitive descriptions thereof are omitted here. In addition, the embodiment may be applied to switches that have the functional configuration illustrated in FIGS. 10 and 13.

In the embodiment, a MAC table represented in FIG. 14 corresponds to the MAC table 932 illustrated in FIG. 9. The MAC table 932 stores information on a port, a VLAN (VLAN ID), a MAC address assigned to the VLAN, and statistical information, in association with each VLAN. The statistical information stored in the MAC table 932 is updated periodically, such as every minute and every hour, for example, based on the statistical information held in the statistical information collection unit 914.

In the example illustrated in FIG. 14, although a reception rate is stored as the statistical information in a unit [bytes/sec], any information representing a traffic volume may be used as the statistical information. For example, a number of frames or bits per unit time, or ranking of reception rates among all VLANs of the switch may be used as the statistical information.

In the example of FIG. 14, when statistical information for each port is compared with each other, the port 1 is 65 (=30+35) megabytes/sec and the port 2 is 55 (=50+5) megabytes/sec, and thus the port 1 has the highest reception rate. Accordingly, in the above embodiment of generating a CNM based on the statistical information for each port, the congestion detection unit 924 selects the port 1 as a port from which a CNM is to be transmitted, based on the statistical information stored in the statistical information collection unit 914. The port information giving unit 934 sets the MAC addresses (A, B, and C) assigned to the port 1 that is selected by the congestion detection unit 924, as destinations of the CNM generated by the CNM generation unit 936.

However, when a reception rate for each VLAN is compared, the reception rate of the VLAN with a VLAN ID=1 that is assigned to the port 2 is 50 megabytes/sec, which is highest. In the embodiment, the port information giving unit 934 sets a MAC address (D) that is assigned to the VLAN with the VLAN ID=1 in the MAC table of FIG. 14, as the destination of the CNM generated by the CNM generation unit 936.

According to the embodiment, it is possible to achieve even more highly precise traffic control to avoid congestion. In addition, the destinations of the CNM are selected per VLAN, so that the number of CNMs to be transmitted is reduced compared to the case of transmitting CNMs per port. This contributes to effective use of the network resources.

In the embodiment, it is possible to identify the VLAN causing the congestion without analyzing a frame, thereby avoiding frame loss that might occur during frame analysis.

<Method of Generating CNM>

Figure 15:
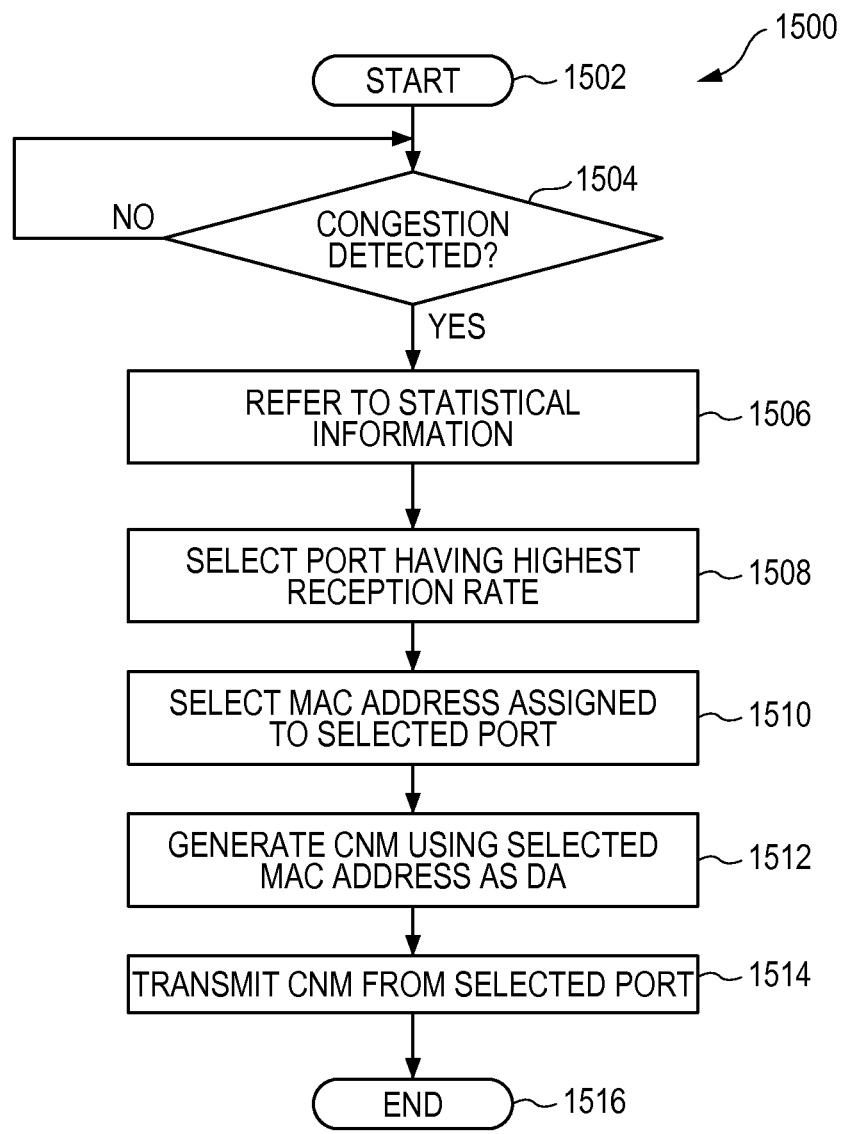
FIG. 15 is a diagram illustrating an example of an operational flowchart representing a method by which a switch generates a CNM, according to an embodiment.

Referring to FIG. 15, a method of generating a CNM is described. FIG. 15 illustrates a flowchart 1500 representing a method by which a switch according to an embodiment generates a CNM. The method represented in FIG. 15 is executed by the switch 800 that is described with the hardware configuration illustrated in FIG. 8 and the functional configuration illustrated in FIG. 9.

The method starts in step 1502.

In step 1504, the congestion detection unit 924 monitors the reception frame buffer 922 to examine whether or not congestion occurs. When the number of frames that have been accumulated in the reception frame buffer 922 is more than a predetermined threshold, the congestion detection unit 924 determines that a congestion state is detected and notifies the port information giving unit 934 and the CNM generation unit 936 of occurrence of the congestion state. Next, the method goes on to step 1506.

In step 1506, the congestion detection unit 924 refers to statistical information that is collected in the statistical information collection unit 914. In step 1508, the congestion detection unit 924 compares pieces of statistical information stored in the statistical information collection unit 914, selects a port that has the highest reception rate, and notifies the port information giving unit 934 of information on the selected port.

Next, in step 1510, the port information giving unit 934 examines a MAC address that is assigned to the port selected by the congestion detection unit 924 in step 1508 by referring to the MAC table 932.

In step 1512, the CNM generation unit 936 generates a CNM and sends the generated CNM to the port information giving unit 934. The port information giving unit 934 sets, as a destination of the CNM generated by the CNM generation unit 936, the MAC address that has been obtained from the MAC table 932 in step 1510. In addition, the port information giving unit 934 provides the CNM with information on the port that is selected by the congestion detection unit 924.

Then, in step 1514, the port information giving unit 934 accumulates, in the transmission frame buffer 926, the CNM to which the destination is set and the port information is given in step 1512. The CNMs that are accumulated in the transmission frame buffer 926 are sequentially transmitted in a manner similar to other frames. Here, since a destination of the CNM is the MAC address that is assigned to a port, determined based on the statistical information, having the highest reception rate, the CNM turn out to be transmitted from the port that has the highest reception rate.

The method is finished in step 1516.

As an alternative, as described above in relation to FIG. 9, in step 1508, a predetermined number of ports that have higher reception rates or one or more ports that have reception rates higher than a predetermined value may also be selected.

As a further alternative, as described above in relation to FIG. 9, the MAC table 932 may also stores statistical information for each MAC address, and. In the case, the statistical information stored in the MAC table 932 may be used for selecting destinations of the CNM and for selecting ports from which the CNMs are to be transmitted.

<Method of Relaying CNM>

Figure 16:
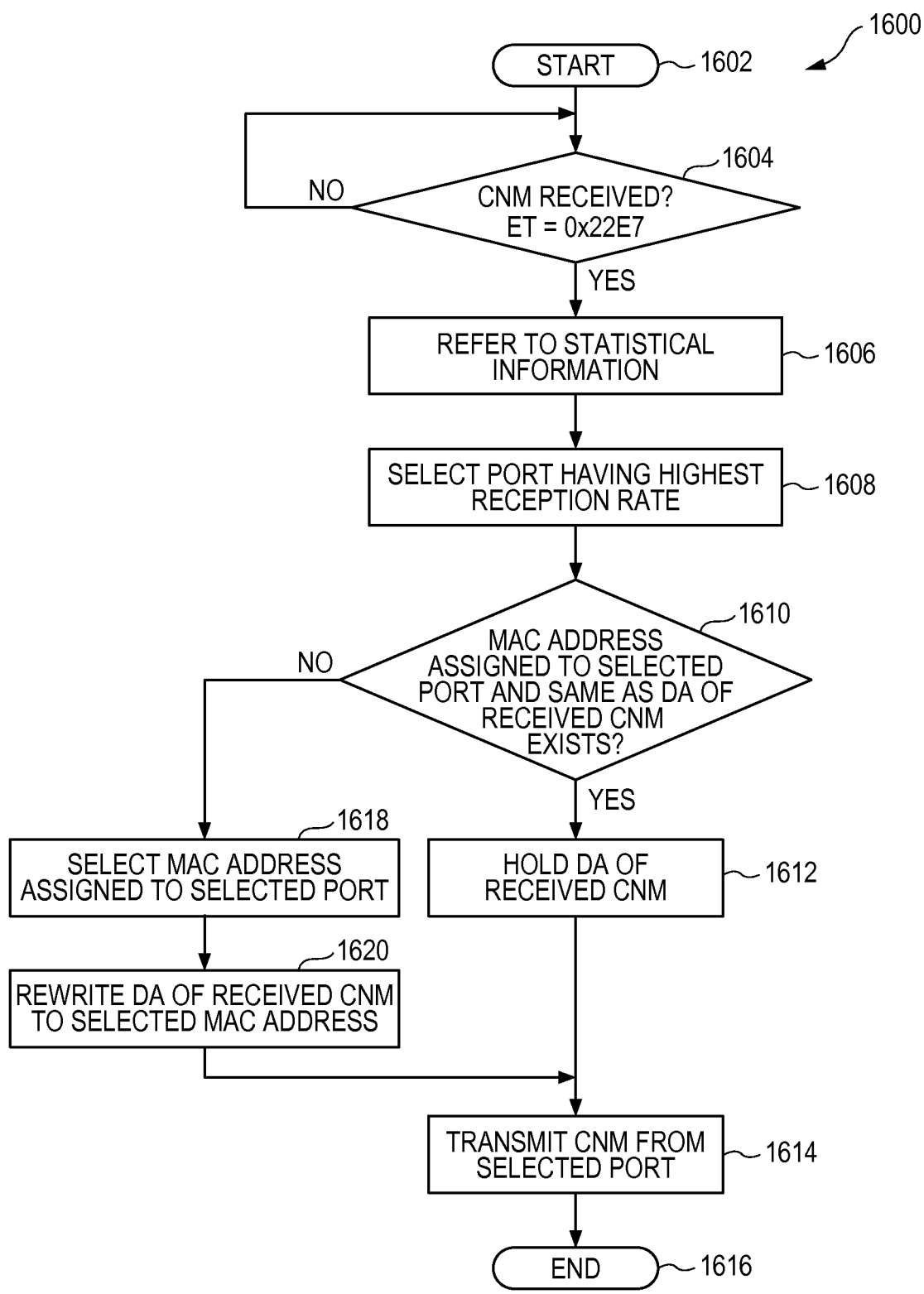
FIG. 16 is a diagram illustrating an example of an operational flowchart representing a method by which a switch relays a CNM, according to an embodiment.

Referring to FIG. 16, a method of relaying a CNM is described. FIG. 16 is an example of a flowchart 1600 representing a method by which a switch according to an embodiment relays a CNM. The method represented in FIG. 16 is executed by the switch 800 that is described with reference to a hardware configuration illustrated in FIG. 8 and a functional configuration illustrated in FIG. 10.

The method starts in step 1602.

In step 1604, the CNM detection unit 917 monitors all ports of the switch 800 to examine whether or not a CNM is received. When the EtherType (ET) field of the received frame is 0x22E7, the CNM detection unit 917 determines that a CNM is received and notifies the congestion detection unit 924 that the CNM is received. The received CNM is stored in the reception frame buffer 922. Next, the method goes on to step 1606.

In step 1606, upon being notified of reception of the CNM from the CNM detection unit 917, the congestion detection unit 924 obtains statistical information from the statistical information collection unit 914.

In step 1608, the congestion detection unit 924 compares pieces of the obtained statistical information with each other, selects a port that has the highest reception rate, and notify the port information giving unit 934 of information on the selected port. For example, the congestion detection unit 924 selects a port that has the highest reception rate.

In step 1610, the port information giving unit 934 compares the MAC addresses that are allocated to the port selected by the congestion detection unit 924 in step 1608, with the MAC address that is set as the destination of the CNM received in step 1604. When there is a MAC address that is the same as the MAC address set as the destination of the CNM, among MAC addresses that are allocated to the port selected in step 1608, the method goes on to step 1612. When there is no same MAC address, the method goes on to step 1618.

In step 1612, the port information giving unit 934 does not change the destination of the CNM that has been received in step 1604. Further, when there is another MAC address that is allocated to the port selected in step 1608 and is different from the MAC address set as the destination of the CNM received in step 1604, the CNM generation unit 936 may generate an additional CNM and the port information giving unit 934 may set the another MAC address to the additional CNM. Next, the method goes on to step 1614.

In step 1618, the port information giving unit 934 searches the MAC table 932 for a MAC address that is allocated to the port defined in step 1608. The port information giving unit 934 selects the MAC address searched for, as the destination of the CNM.

In step 1620, the port information giving unit 934 rewrites the destination of the CNM that is received in step 1604 to the MAC address that is allocated to the port selected in step 1608. In this case, the CNM generation unit 936 may generate additional CNMs and the port information giving unit 934 may also set all MAC addresses that are allocated to the port selected in step 1608 as the destinations of the additional CNMs.

Then, in step 1614, the port information giving unit 934 accumulates the CNM that is received in step 1604 (the CNM having the destination that is not rewritten in step 1612) or the CNM having the destination rewritten in step 1620 in the transmission frame buffer 926. The CNMs that are accumulated in the transmission frame buffer 926 are sequentially transmitted from the selected port in a manner similar to other frames.

Here, since the destination of the CNM is the MAC address that is assigned to a port that is selected based on the statistical information and has the highest reception rate, the CNM turns out to be transmitted from the port that has the highest reception rate.

The method is finished in step 1616.

As an alternative, as described above in relation to FIG. 9 or 10, in step 1608, a predetermined number of ports that have higher reception rates or one or more ports that have reception rates higher than a predetermined value may also be selected.

As a further alternative, as described above in relation to FIG. 9 or 10, the MAC table 932 may also store statistical information for each MAC address, and the statistical information may be used for selecting the destinations of the CNM and for selecting ports from which the CNMs are to be transmitted.

<Method of Generating CNM Using Detection of FIP Frame as Trigger>

Figure 17:
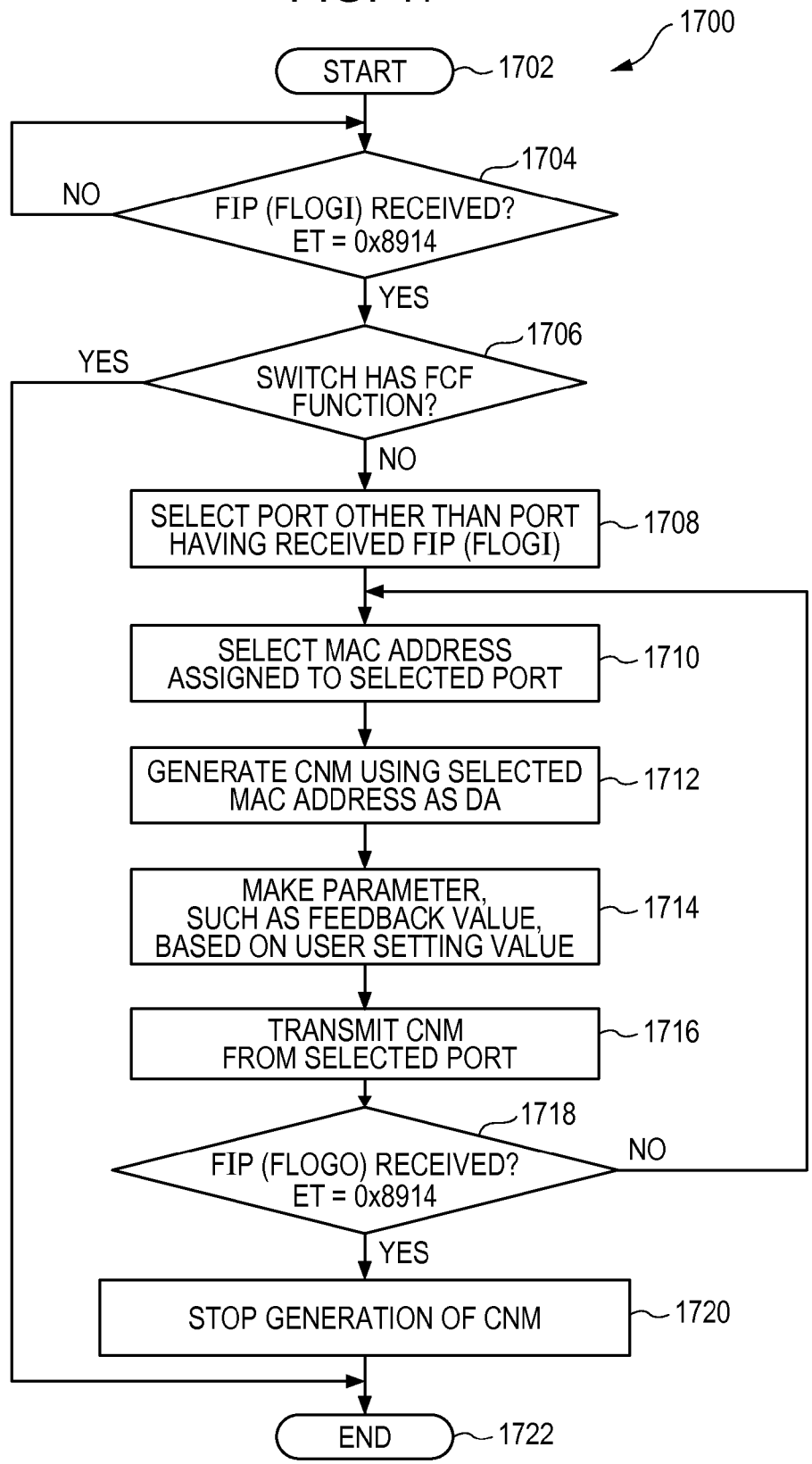
FIG. 17 is a diagram illustrating an example of an operational flowchart representing a method by which a switch avoids congestion, according to an embodiment.

Referring to FIG. 17, a method by which a switch avoids congestion prior to lossless traffic communication is described. FIG. 17 is a flowchart 1700 representing a method by which a switch according to an embodiment avoids congestion. The method represented in FIG. 17 is executed by the switch 800 that is described with reference to the hardware configuration illustrated in FIG. 8 and the functional configuration illustrated in FIG. 13.

While FCoE is taken as an example of lossless traffic for explanation in an embodiment, the embodiment is also applicable to any other lossless traffic.

The method starts in step 1702.

In step 1704, the FIP/FCoE detection unit 918 monitors frames that are received via each port to examine whether or not an FIP frame is received. Further, the FIP/FCoE detection unit 918 analyzes the FIP frame as described in relation to FIG. 13. When it is determined that the received FIP frame is an FIP frame being processed in operational step 1214 (FLOGI/FDISC) of FIG. 12, the FIP/FCoE detection unit 918 notifies the CNM generation unit 936 of information on the received FIP frame. Further, the FIP/FCoE detection unit 918 may also send or notify the FIP frame being processed in operational step 1214 (FLOGI/FDISC) to the port information giving unit 934.

In step 1706, the port information giving unit 934 examines whether or not the switch 800 is provided with an FCF function. When an FCF function is provided for the switch 800, the method is finished in step 1722 without executing later steps so as to reduce processing load of the switch 800. When an FCF function is not provided for the switch 800, the method goes on to step 1708.

In step 1708, the port information giving unit 934 selects a port other than the port that has received the FIP frame of FLOGI/FDISC in step 1704.

In step 1710, the port information giving unit 934 obtains the MAC address that is assigned to the port selected in step 1708 by referring to the MAC table 932.

In step 1712, the CNM generation unit 936 generates a CNM in response to the notification from the FIP/FCoE detection unit 918 and sends the generated CNM to the port information giving unit 934. The port information giving unit 934 sets the MAC address that is obtained in step 1710 as the destination of the CNM generated by the CNM generation unit 936.

In step 1714, the port information giving unit 934 makes a parameter that is included in the CNM, such as a feedback value, based on a value that is set by a user.

In step 1716, the port information giving unit 934 forwards the CNM to the transmission frame buffer 926. The CNMs that are accumulated in the transmission frame buffer 926 are sequentially transmitted from the selected port in a manner similar to other frames.

In step 1718, the FIP/FCoE detection unit 918 monitors frames that are received via each port to examine whether or not an FIP frame is received. Further, the FIP/FCoE detection unit 918 analyzes the FIP frame as described in relation to FIG. 13 and, when the received FIP frame is a FIP frame being processed in operational step 1218 (FLOGO) of FIG. 12, the FIP/FCoE detection unit 918 notifies the CNM generation unit 936 of information on the received FIP frame. Further, the FIP/FCoE detection unit 918 may also send or notify the FIP frame being processed in operational step 1218 (FLOGO) to the port information giving unit 934.

In step 1720, the CNM generation unit 936 stops generation of a CNM. As a result, since transmission of a CNM to each Enode that previously received the CNM is stopped, the Enode cancels inhibition of the traffic volume to be transmitted.

The method is finished in step 1722.

<Method of Generating CNM Using Detection of FCoE Frame as Trigger>

Figure 18:
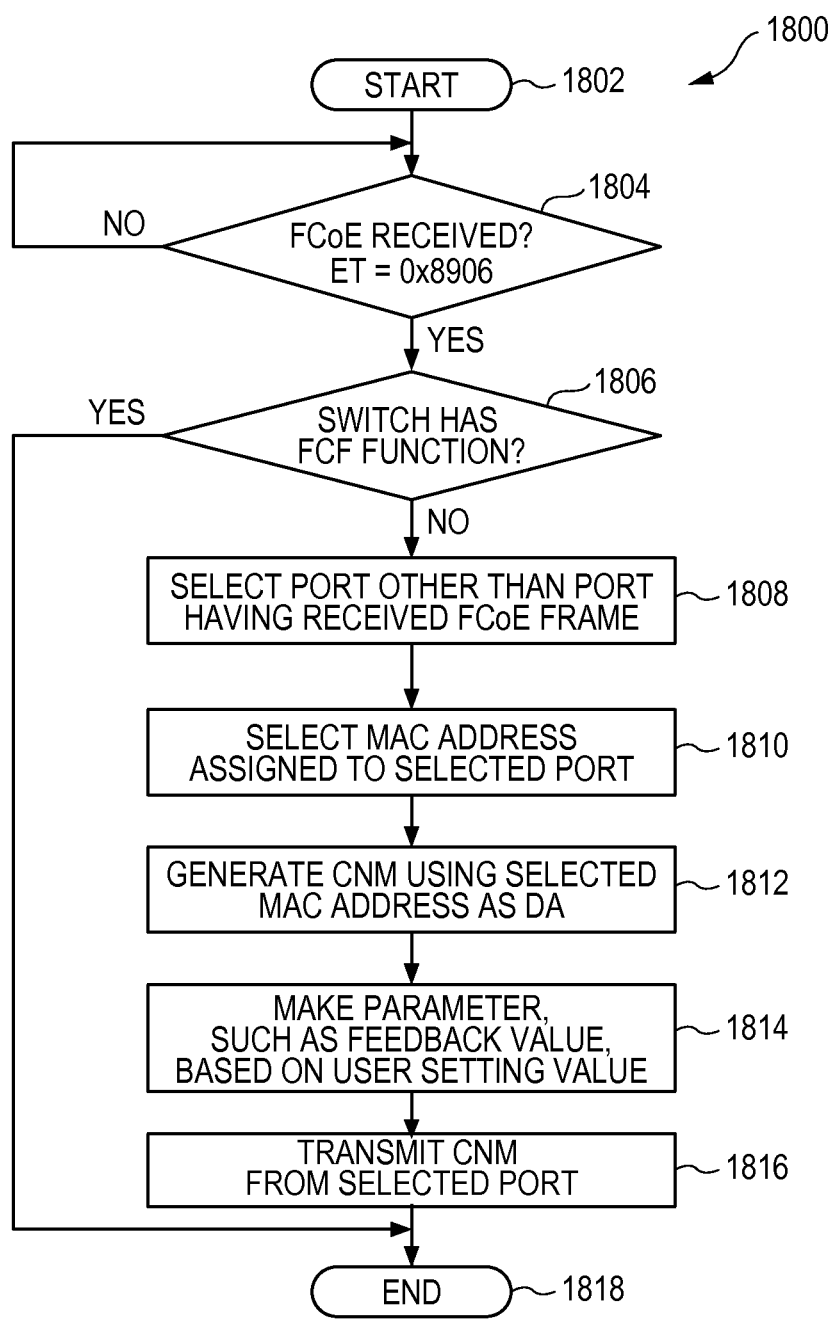
FIG. 18 is a diagram illustrating an example of an operational flowchart representing another method by which a switch avoids congestion, according to an embodiment.

Referring to FIG. 18, a method by which a switch avoids congestion after starting lossless traffic communication is described. FIG. 18 is a flowchart 1800 representing another method by which a switch according to an embodiment avoids congestion. The method that is represented in FIG. 18 is executed by the switch 800 that is described with reference to the hardware configuration illustrated in FIG. 8 and the functional configuration illustrated in FIG. 13.

Although FCoE is taken as an example of lossless traffic for explanation in an embodiment, the embodiment is also applicable to any other lossless traffic.

The method starts in step 1802.

In step 1804, the FIP/FCoE detection unit 918 monitors frames that are received via each port to examine whether or not an FCoE frame is received in a manner as described in relation to FIG. 13. Further, the FIP/FCoE detection unit 918 analyzes the FCoE frame and, when it is determined that the received FCoE frame is an FCoE frame being processed in operational step 1216 (FCoE data communication) of FIG. 12, the FIP/FCoE detection unit 918 notifies the CNM generation unit 936 of information on the received FCoE frame. Further, the FIP/FCoE detection unit 918 may also send or notify the FCoE frame being processed in operational step 1216 (FCoE data communication) to the port information giving unit 934.

In step 1806, the port information giving unit 934 examines whether or not the switch 800 is provided with an FCF function. When an FCF function is provided for the switch 800, the method is finished in step 1818 without executing later steps so as to reduce processing load of the switch 800. When an FCF function is not provided for the switch 800, the method goes on to step 1808.

In step 1808, the port information giving unit 934 selects a port other than the port that has received the FCoE frame in step 1804.

In step 1810, the port information giving unit 934 obtains the MAC address that is assigned to the port selected in step 1808 by referring to the MAC table 932.

In step 1812, the CNM generation unit 936 generates a CNM in response to the notification from the FIP/FCoE detection unit 918 to send the generated CNM to the port information giving unit 934. The port information giving unit 934 sets the MAC address that is obtained in step 1810 as the destination of the CNM that is generated by the CNM generation unit 936.

In step 1814, the port information giving unit 934 makes a parameter that is included in the CNM, such as a feedback value, based on a value that is set by a user.

In step 1816, the port information giving unit 934 forwards the CNM to the transmission frame buffer 926. The CNMs that are accumulated in the transmission frame buffer 926 are sequentially transmitted from the selected port in a manner similar to other frames.

The method is finished in step 1818.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method for controlling congestion in a communication network, the method being performed by a node in the communication network, the method comprising:
   providing a table that associates each of a plurality of ports provided for the node with at least one address assigned to at least one of a plurality of transmission source devices that are coupled to the node via the communication network;
   detecting first congestion in the communication network, based on frames that are received via the plurality of ports and stored in a frame buffer provided for the node;
   determining one or more first ports that receive frames causing the detected first congestion, based on a current traffic volume of each of the plurality of ports;
   determining, regardless of source addresses included in the received frames, a first transmission source device whose address is associated with the each first port in the table as a transmission source device causing the detected first congestion;
   setting a first address assigned to the first transmission source device as a destination address of a congestion notification message for giving notice of the detected first congestion; and
   transmitting, via each of the determined one or more first ports, the congestion notification message whose destination address is the first address, to the first transmission source device.

2. The method of claim 1, further comprising
selecting a VLAN causing the detected first congestion from among VLANs assigned to the plurality of ports, based on reception rates of the VLANs.

3. The method of claim 1, further comprising:
receiving, via one of the plurality of ports, a congestion notification message for giving notice of second congestion in the communication network; and
rewriting a destination of the received congestion notification message to an address associated with the determined one or more first ports.

4. The method of claim 1, further comprising
determining one or more second ports from which a congestion notification message for giving notice of the detected first congestion is to be transmitted, based on types of frames received via the plurality of ports and reception rates of the plurality of ports.

5. The method of claim 4, further comprising
stopping transmission of the congestion notification message from the determined one or more second ports.

6. The method of claim 5, wherein
the types of frames include a fiber channel over Ethernet (FCoE) frame and a FCoE initialization protocol (FIP) frame.

7. An apparatus for controlling congestion in a communication network, the apparatus comprising:
   a plurality of ports configured to transmit and receive frames;
   a memory configured:
      to include a frame buffer for storing frames,
      to include a table that associates each of the plurality of ports with at least one address assigned to at least one of a plurality of transmission source devices that are coupled to the apparatus via the communication network, and
      to store a traffic volume of each of the plurality of ports; and
   a processor configured:
      to detect first congestion in the communication network, based on frames that are received via the plurality of ports and stored in the frame buffer,
      to determine one or more first ports that receive frames causing the detected first congestion, based on current traffic volumes of the plurality of ports,
      to determine, regardless of source addresses included in the received frames, a first transmission source device whose address is associated with the each first port in the table as a transmission source device causing the detected first congestion,
      to set a first address assigned to the first transmission source device as a destination address of a congestion notification message for giving notice of the detected first congestion, and
      to transmit, via each of the determined one or more first ports, a congestion notification message whose destination address is the first address, to the first transmission source device.

8. The apparatus of claim 7, wherein
the processor selects a VLAN causing the detected first congestion from among VLANs assigned to the plurality of ports, based on reception rates of the VLANs.

9. The apparatus of claim 7, wherein
the processor receives, via one of the plurality of ports, a congestion notification message for giving notice of second congestion in the communication network; and the processor rewrites a destination of the received congestion notification message to an address associated with the one or more first ports.

10. The apparatus of claim 7, wherein
the processor determines one or more second ports from which a congestion notification message for giving notice of the detected first congestion is to be transmitted, based on types of frames received via the plurality of ports and reception rates of the plurality of ports.

11. The apparatus of claim 10, wherein
transmission of the congestion notification message from the determined one or more second ports is stopped.

12. The apparatus of claim 11, wherein
the types of frames include a fiber channel over Ethernet (FCoE) frame and a FCoE initialization protocol (FIP) frame.

13. A non-transitory computer readable recording medium having stored therein a program causing a computer to execute a control process for controlling congestion in a communication network, the control process comprising:
providing a table that associates each of a plurality of ports provided for the node with at least one address assigned to at least one of a plurality of transmission source devices that are coupled to the node via the communication network;
detecting first congestion in the communication network, based on frames that are received via the plurality of ports and stored in a frame buffer provided for the computer;
determining one or more first ports that receive frames causing the detected first congestion, based on a current traffic volume of each of the plurality of ports;
determining, regardless of source addresses included in the received frames, a first transmission source device whose address is associated with the each first port in the table as a transmission source device causing the detected first congestion;
setting a first address assigned to the first transmission source device as a destination address of a congestion notification message for giving notice of the detected first congestion; and
transmitting, via each of the determined one or more first ports, a congestion notification message whose destination address is the first address, to the first transmission source device.

14. The non-transitory computer readable recording medium of claim 13, wherein the control process further comprises
selecting a VLAN causing the detected first congestion from among VLANs assigned to the plurality of ports, based on reception rates of the VLANs.

15. The non-transitory computer readable recording medium of claim 13, wherein the control process further comprises:
receiving, via one of the plurality of ports, a congestion notification message for giving notice of second congestion in the communication network; and
rewriting a destination of the received congestion notification message to an address associated with the one or more first ports.

16. The non-transitory computer readable recording medium of claim 13, wherein the control process further comprises
determining one or more second ports from which a congestion notification message for giving notice of the detected first congestion is to be transmitted, based on types of frames received via the plurality of ports and reception rates of the plurality of ports.

17. The non-transitory computer readable recording medium of claim 16, wherein the control process further comprises
stopping transmission of the congestion notification message from the determined one or more second ports.

18. The non-transitory computer readable recording medium of claim 17, wherein
the types of frames include a fiber channel over Ethernet (FCoE) frame and a FCoE initialization protocol (FIP) frame.

19. The method of claim 1, wherein
the traffic volume is determined based on a reception rate obtained by counting a number of data units that are received per unit time via each of the plurality of ports.

* * * * *